US010442175B2

(12) United States Patent
Schlachter

(10) Patent No.: US 10,442,175 B2
(45) Date of Patent: Oct. 15, 2019

(54) 3D PRINTING DEVICES AND METHODS

(71) Applicant: Warsaw Orthopedic, Inc., Warsaw, IN (US)

(72) Inventor: Kelly Schlachter, Mason, TN (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 607 days.

(21) Appl. No.: 14/698,527

(22) Filed: Apr. 28, 2015

(65) Prior Publication Data

US 2016/0318247 A1 Nov. 3, 2016

(51) Int. Cl.
*B33Y 30/00* (2015.01)
*B33Y 10/00* (2015.01)
*B29C 64/106* (2017.01)
*B29C 64/20* (2017.01)
*B29C 35/08* (2006.01)
*B29L 31/00* (2006.01)

(52) U.S. Cl.
CPC ............ *B33Y 30/00* (2014.12); *B29C 64/106* (2017.08); *B29C 64/20* (2017.08); *B33Y 10/00* (2014.12); *B29C 2035/0838* (2013.01); *B29K 2995/006* (2013.01); *B29L 2031/7532* (2013.01)

(58) Field of Classification Search
CPC ................................ B33Y 10/00; B33Y 30/00
See application file for complete search history.

(56) References Cited

U.S. PATENT DOCUMENTS

| 7,832,457 | B2 | 11/2010 | Calnan et al. |
| 8,778,252 | B2 | 7/2014 | Mackie et al. |
| 2001/0035886 | A1 | 11/2001 | Bradshaw et al. |
| 2005/0208168 | A1 | 9/2005 | Hickerson et al. |
| 2006/0054039 | A1* | 3/2006 | Kritchman ............ B29C 64/245 101/424.1 |
| 2008/0042321 | A1 | 2/2008 | Russell et al. |
| 2012/0165969 | A1* | 6/2012 | Elsey ...................... B29C 64/20 700/120 |
| 2014/0117585 | A1* | 5/2014 | Douglas .................. B29C 47/92 264/401 |
| 2014/0191439 | A1 | 7/2014 | Davis |
| 2015/0037527 | A1* | 2/2015 | Jacobs .................... B29C 64/40 428/41.7 |
| 2016/0096323 | A1* | 4/2016 | Fry ...................... B29C 67/0059 264/308 |

FOREIGN PATENT DOCUMENTS

| WO | 2004/016438 A1 | 2/2004 |
| WO | 2014092651 A1 | 6/2014 |

* cited by examiner

*Primary Examiner* — Jacob T Minskey
*Assistant Examiner* — Melody Tsui

(57) ABSTRACT

A device is provided for making an implant having a hollow region, the device comprising a print surface rotatable in a clockwise and counterclockwise direction about an axis of rotation; a print head disposed adjacent to and substantially transverse to the print surface, the print head configured to apply material used to make the implant on at least a portion of the print surface or heat material disposed on at least a portion of the print surface used to make the implant; and a base disposed adjacent to the print head and contacting the print surface, the base configured to be movable in forward, backward and lateral directions relative to the print head to make the implant having the hollow region. Methods of using the device and are also disclosed.

19 Claims, 9 Drawing Sheets

3D PRINTING DEVICES AND METHODS

BACKGROUND 3D printing technology is applied in various industries for manufacturing and planning. For example, the automotive, aerospace and consumer goods industries use 3D printing to create prototypes of parts and products. 3D printing has also been used in the architectural industry for printing structural models. The applications of 3D printing in private and government defense have grown rapidly as well.

3D printing has had a significant impact in the medical fields. Medical applications of 3D printing date back to the early 2000s, for example, with the production of dental implants and prosthetics. 3D printing has also been used in the fabrication of drug delivery devices that can be used for direct treatment. A variety of drug delivery devices may be created which allow for customizable drug release profiles.

Traditional 3D printing allows an object to be created by depositing a material over a flat fabrication platform one layer at a time. Once a first layer is deposited, a second layer is deposited on top of the first layer. The process is repeated as necessary to create a multi-laminate solid object. However, 3D printing does not allow for continuous extrusion to create an object.

Conventionally, bone tissue regeneration is achieved by filling a bone repair site with a bone graft. Over time, the bone graft is incorporated by the host and new bone remodels the bone graft. In order to place the bone graft, it is common to use a monolithic bone graft or to form an osteoimplant comprising particulated bone in a carrier. The carrier is thus chosen to be biocompatible, to be resorbable, and to have release characteristics such that the bone graft is accessible. Generally, the formed implant, whether monolithic or particulated and in a carrier, are substantially solid at the time of implantation and thus do not conform to the implant site. Further, the implant is substantially complete at the time of implantation and thus provides little ability for customization, for example by the addition of autograft.

Traditional methods of 3D printing allows for objects to be created through layered stratification of print material onto a flat surface. The layered stratified products created through traditional 3D printing lack the strength and flexibility necessary to make a hollow implant. As such, a suitable implant having a hollow center for particulated bone or other osteogenic materials is difficult to manufacture through traditional 3D printing methods.

Thus, there is a need for a 3D printing device that can manufacture hollow structures for implantable medical devices, such as for example, mesh covering or bags that are strong, flexible, stretchable and biocompatible. There is a need for a 3D printing device having a rotatable printing surface that allows continuous extrusion instead of stratified layers to manufacture hollow structures for implantable medical devices.

SUMMARY

Provided are 3D printing devices and methods of use for creating hollow structures such as mesh bags. Also provided are 3D printing devices including a rotatable printing surface to create such hollow structures. Further provided are devices and methods for 3D printing onto such a rotatable printing surface by continuous extrusion instead of stratified layers. Additionally, provided are devices and methods for creating structures having a meshed design that are strong, flexible, stretchable and biocompatible. In some embodiments, because the implant is printed continuously, there is no need to seal all sides of the implant, at most two sides or one side of the implant.

According to one aspect, provided is a device for making an implant having a hollow region, the device comprising a print surface rotatable in a clockwise and counterclockwise direction about an axis of rotation; a print head disposed adjacent to and substantially transverse to the print surface, the print head configured to apply material used to make the implant on at least a portion of the print surface or heat material disposed on at least a portion of the print surface used to make the implant; and a base disposed adjacent to the print head and contacting the print surface, the base configured to be movable in forward, backward and lateral directions relative to the print head to make the implant having the hollow region.

According to another aspect, provided is a device for making an implant having a hollow region, the device comprising a print surface rotatable in a clockwise and counterclockwise direction about an axis of rotation relative to a print head, and at least one of (i) the print surface configured to be movable in forward and backward directions relative to the print head or (ii) the print head configured to be movable in forward and backward directions relative to the print surface, the print head disposed adjacent to and substantially transverse to the print surface; and the print head configured to apply material used to make the implant on at least a portion of the print surface or heat material disposed on at least a portion of the print surface used to make the implant having the hollow region.

According to yet another aspect, provided is a method for making an implant having a hollow region, the method comprising applying a material used to make the implant having the hollow region on a device having a print surface, the device having the print surface rotatable in a clockwise and counterclockwise direction about an axis of rotation, a print head disposed adjacent to and substantially transverse to the print surface, the print head configured to apply the material used to make the implant on at least a portion of the print surface or heat material applied on at least the portion of the print surface used to make the implant, a base disposed adjacent to the print head and contacting the print surface, the base configured to be movable in forward, backward and lateral directions relative to the print head to make the implant having the hollow region.

According to yet another aspect, provided is a computer-implemented method for creating hollow structures, the method comprising inputting instructions to direct a processor, the processor configured to induce rotation of a print surface in alternating clockwise and counterclockwise directions, and ejection of material from a print head to the print surface to make a strand having a wave-like pattern with alternating peaks and crests, and rotating the print head such an angular distance to create a plurality of interconnected strands on the print surface.

While multiple embodiments are disclosed, still other embodiments of the present application will become apparent to those skilled in the art from the following detailed description, which is to be read in connection with the accompanying drawings. As will be apparent, the present disclosure is capable of modifications in various obvious aspects, all without departing from the spirit and scope of the present disclosure. Accordingly, the detailed description is to be regarded as illustrative in nature and not restrictive.

Figure 1:
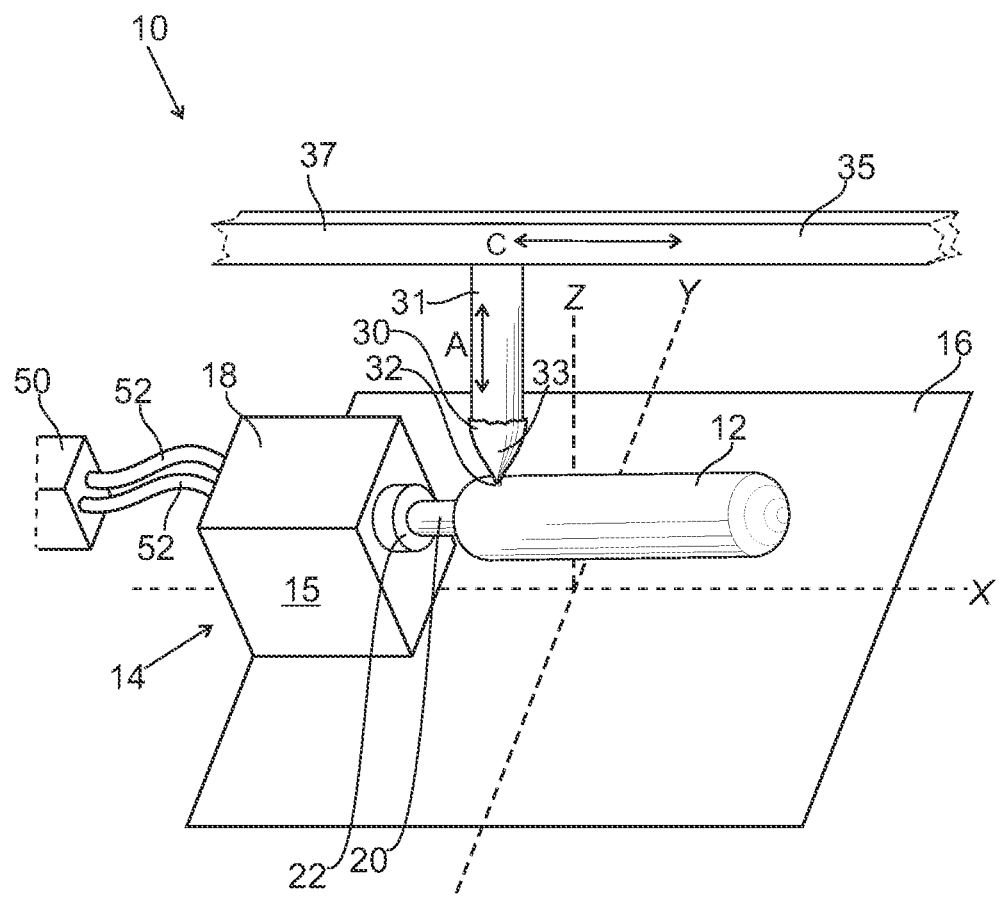
FIG. 1 illustrates a perspective view of an exemplary 3D printing device according to an aspect of the present application. The 3D printing device includes a rotatable printing surface to facilitate continuous extrusion of a predetermined hollow implant.

It is to be understood that the figures are not drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION

Definitions

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about." Similarly, when values are expressed as approximations, by use of the antecedent "about," it will be understood that the particular value forms another embodiment that is +/−10% of the recited value. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

Notwithstanding that the numerical ranges and parameters setting forth the broad scope of this application are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

Bioactive agent or bioactive compound is used herein to refer to a compound or entity that alters, inhibits, activates, or otherwise affects biological or chemical events. For example, bioactive agents may include, but are not limited to, osteogenic or chondrogenic proteins or peptides, anti-AIDS substances, anti-cancer substances, antibiotics, immunosuppressants, anti-viral substances, enzyme inhibitors, hormones, neurotoxins, opioids, hypnotics, anti-histamines, lubricants, tranquilizers, anti-convulsants, muscle relaxants and anti-Parkinson substances, anti-spasmodics and muscle contractants including channel blockers, miotics and anti-cholinergics, anti-glaucoma compounds, anti-parasite and/or anti-protozoal compounds, modulators of cell-extracellular matrix interactions including cell growth inhibitors and antiadhesion molecules, vasodilating agents, inhibitors of DNA, RNA or protein synthesis, anti-hypertensives, analgesics, anti-pyretics, steroidal and non-steroidal anti-inflammatory agents, anti-angiogenic factors, angiogenic factors, anti-secretory factors, anticoagulants and/or antithrombotic agents, local anesthetics, ophthalmics, prostaglandins, anti-depressants, anti-psychotic substances, anti-emetics, and imaging agents. In certain embodiments, the bioactive agent is a drug. Bioactive agents further include RNAs, such as siRNA, and osteoclast stimulating factors. In some embodiments, the bioactive agent may be a factor that stops, removes, or reduces the activity of bone growth inhibitors. In some embodiments, the bioactive agent is a growth factor, cytokine, extracellular matrix molecule or a fragment or derivative thereof, for example, a cell attachment sequence such as RGD. A more complete listing of bioactive agents and specific drugs suitable for use in the present application may be found in "Pharmaceutical Substances: Syntheses, Patents, Applications" by Axel Kleemann and Jurgen Engel, Thieme Medical Publishing, 1999; the "Merck Index: An Encyclopedia of Chemicals, Drugs, and Biologicals", edited by Susan Budavari et al., CRC Press, 1996; and the United States Pharmacopeia-25/National Formulary-20, published by the United States Pharmacopeia Convention. Inc., Rockville Md., 2001, each of which is incorporated herein by reference.

Biocompatible, as used herein, is intended to describe materials that, upon administration in vivo, do not induce undesirable long-term effects.

Bone, as used herein, refers to bone that is cortical, cancellous or cortico-cancellous of autogenous, allogenic, xenogenic, or transgenic origin.

Bone graft, as used herein, refers to any implant prepared in accordance with the embodiments described herein and therefore may include expressions such as bone material and bone membrane.

Demineralized, as used herein, refers to any material generated by removing mineral material from tissue, for example, bone tissue. In certain embodiments, the demineralized compositions described herein include preparations containing less than 5% calcium. In some embodiments, the demineralized compositions may comprise less than 1% calcium by weight. In some embodiments, the compositions may comprise less than 5, 4, 3, 2 and/or 1% calcium by weight. Partially demineralized bone is intended to refer to preparations with greater than 5% calcium by weight but containing less than 100% of the original starting amount of calcium. In some embodiments, partially demineralized bone comprises 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 and/or 99% of the original starting amount of calcium.

In some embodiments, demineralized bone has less than 95% of its original mineral content. In some embodiments, demineralized bone has less than 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6 and/or 5% of its original content. In some embodiments, "Demineralized" is intended to encompass such expressions as "substantially demineralized," "partially demineralized," "surface demineralized," and "fully demineralized." "Partially demineralized" is intended to encompass "surface demineralized."

In some embodiments, the demineralized bone may be surface demineralized from about 1-99%. In some embodiments, the demineralized bone is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 and/or 99% surface demineralized. In various embodiments, the demineralized bone may be surface demineralized from about 15-25%. In some embodiments, the demineralized bone is 15, 16, 17, 18, 19, 20, 21, 22, 23, 24 and/or 25% surface demineralized.

Demineralized bone activity refers to the osteoinductive activity of demineralized bone.

Demineralized bone matrix (DBM), as used herein, refers to any material generated by removing mineral material from bone tissue. In some embodiments, the DBM compositions as used herein include preparations containing less than 5% calcium and, in some embodiments, less than 1% calcium by weight. In some embodiments, the DBM compositions include preparations that contain less than 5, 4, 3, 2 and/or 1% calcium by weight. In other embodiments, the DBM compositions comprise partially demineralized bone (e.g., preparations with greater than 5% calcium by weight but containing less than 100% of the original starting amount of calcium).

Osteoconductive, as used herein, refers to the ability of a substance to serve as a template or substance along which bone may grow.

Osteogenic, as used herein, refers to materials containing living cells capable of differentiation into bone tissue.

Osteoinductive, as used herein, refers to the quality of being able to recruit cells from the host that have the potential to stimulate new bone formation. Any material that can induce the formation of ectopic bone in the soft tissue of an animal is considered osteoinductive. For example, most osteoinductive materials induce bone formation in athymic rats when assayed according to the method of Edwards et al., "Osteoinduction of Human Demineralized Bone: Characterization in a Rat Model," Clinical Orthopaedics & Rel. Res., 357:219-228, December 1998, incorporated herein by reference.

Superficially demineralized, as used herein, refers to bone-derived elements possessing at least about 90 weight percent of their original inorganic mineral content. In some embodiments, superficially demineralized contains at least about 90, 91, 92, 93, 94, 95, 96, 97, 98 and/or 99 weight percent of their original inorganic material. The expression "partially demineralized" as used herein refers to bone-derived elements possessing from about 8 to about 90 weight percent of their original inorganic mineral content. In some embodiments, partially demineralized contains about 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 and/or 90 weight percent of their original inorganic mineral content. The expression "fully demineralized" as used herein refers to bone containing less than 8% of its original mineral context. In some embodiments, fully mineralized contains about less than 8, 7, 6, 5, 4, 3, 2 and/or 1% of its original mineral content.

The expression "average length to average thickness ratio" as applied to the DBM fibers of the present application means the ratio of the longest average dimension of the fiber (average length) to its shortest average dimension (average thickness). This is also referred to as the "aspect ratio" of the fiber.

Fibrous, as used herein, refers to bone elements whose average length to average thickness ratio or aspect ratio of the fiber is from about 50:1 to about 1000:1. In some embodiments, average length to average thickness ratio or aspect ratio of the fiber is from about 50:1, 75:1, 100:1, 125:1, 150:1, 175:1, 200:1, 225:1, 250:1, 275:1, 300:1, 325:1, 350:1, 375:1, 400:1, 425:1, 450:1, 475:1, 500:1, 525:1, 550:1, 575:1, 600:1, 625:1, 650:1, 675:1, 700:1, 725:1, 750:1, 775:1, 800:1, 825:1, 850:1, 875:1, 900:1, 925:1, 950:1, 975:1 and/or 1000:1. In overall appearance the fibrous bone elements can be described as bone fibers, threads, narrow strips, or thin sheets. Often, where thin sheets are produced, their edges tend to curl up toward each other. The fibrous bone elements can be substantially linear in appearance or they can be coiled to resemble springs. In some embodiments, the bone fibers are of irregular shapes including, for example, linear, serpentine or curved shapes. The bone fibers are preferably demineralized however some of the original mineral content may be retained when desirable for a particular embodiment. In various embodiments, the bone fibers are mineralized. In some embodiments, the fibers are a combination of demineralized and mineralized.

Non-fibrous, as used herein, refers to elements that have an average width substantially larger than the average thickness of the fibrous bone element or aspect ratio of less than from about 50:1 to about 1000:1. Preferably the non-fibrous bone elements are shaped in a substantially regular manner or specific configuration, for example, triangular prism, sphere, cube, cylinder and other regular shapes. By contrast, particles such as chips, shards, or powders possess irregular or random geometries. It should be understood that some variation in dimension will occur in the production of the elements of this application and elements demonstrating such variability in dimension are within the scope of this application and are intended to be understood herein as being within the boundaries established by the expressions "mostly irregular" and "mostly regular".

The bone implant devices and methods according to the present application increase DBM content in the device, increase the surface area of the DMB, and uniformly distribute the DBM throughout the delivery device to enhance bone growth when the delivery device is implanted at a bone defect. The bone implant devices and methods provided enhance bone growth by reducing the gaps that may exist between the DBM particles and reduce the distance for cells (e.g., osteoclasts, osteoblasts, etc.) to travel throughout the device to allow those cells to receive an adequate osteoinductive signal as opposed to only along the surface of the device. In some embodiment, the device improves the fusion of adjacent interspinous processes.

According to one aspect, there is a bone graft delivery device comprising: a porous biodegradable graft body for inducing bone growth at a surgical site, the porous biodegradable graft body having demineralized bone matrix (DBM) fibers disposed within the porous biodegradable body, and DBM powder disposed adjacent to, on or in the DBM fibers, wherein the porous biodegradable graft body facilitates transfer of cells into and out of the porous biodegradable graft body to induce bone growth at the surgical site.

3D Printer Device

Provided are 3D printing devices and methods of use for creating hollow structures such as mesh bags. Also provided are 3D printing devices including a rotatable printing surface to create such hollow structures. Further provided are devices and methods for 3D printing onto such a rotatable printing surface by continuous extrusion instead of stratified layers. Additionally, provided are devices and methods for creating structures having a meshed design that are strong, flexible, stretchable and biocompatible.

Turning now to FIGS. 1-7, provided is a 3D printing device 10 for fabricating hollow structures, such as, mesh bags 70. 3D printing is typically done in 2 dimensions, one layer at a time. Material is laid out on a flat surface and the three dimensional structures are built up one layer at a time, usually through a melting or sintering process. In some embodiments, a 3D printer having a rotatable printing surface is provided to allow printing hollow structures, such as, for example, mesh bags. In some embodiments, a print head applies material to the print surface through continuous extrusion, instead of stratified layers, as is done by traditional 3D printing devices. In some embodiments, the provided 3D printing device creates stronger structures and generates less waste than traditional 3D printing devices.

As shown in FIG. 1, provided is a 3D printing device 10 for use in the fabrication of mesh bags 70. 3D printing device 10 includes a table 14 having a base 16 and a printing surface 12. In some embodiments, printing surface 12 is mounted to printing table 14 including a base 16. Base 16 is configured for planar movement. In some embodiments, base 16 is movable in the x-y plane and is laterally movable in both the x axis and the y axis for precise positioning of printing surface 12. Printing surface 12, in some embodiments, is fixedly disposed with table 14 such that lateral movement of base 16 causes lateral movement of printing surface 12. Movement of base 16 allows for positioning of printing surface 12 relative to print head 30 to facilitate depositing materials onto printing surface 12, as discussed herein.

Figure 2:
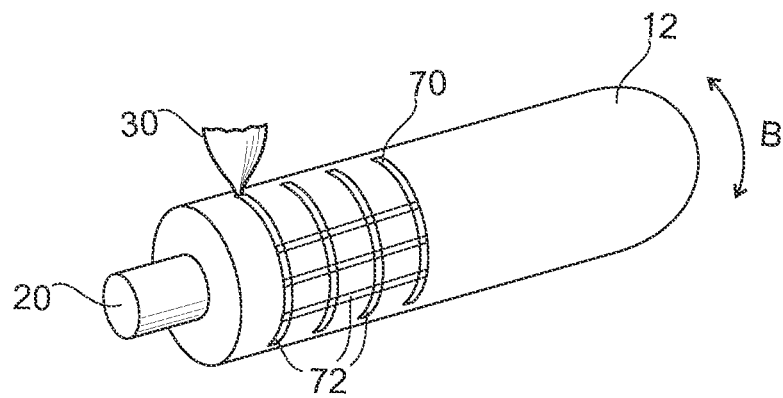
FIG. 2 illustrates a perspective view of components of an exemplary 3D printing device according to an aspect of the present application. Specifically, shown is a printing surface having a cylindrical shape configured to create a cylindrically shaped hollow structure, such as a mesh bag. The printing surface is adjacent to and/or contacts a print head.
Figure 3:
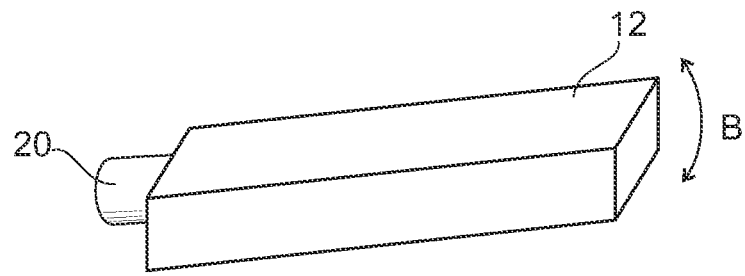
FIG. 3 illustrates a perspective view of components of an exemplary 3D printing device according to an aspect of the present application. Specifically, shown is a printing surface having a rectangular cross section configured to create a rectangular or square shaped hollow structure, such as a mesh bag.
Figure 4:
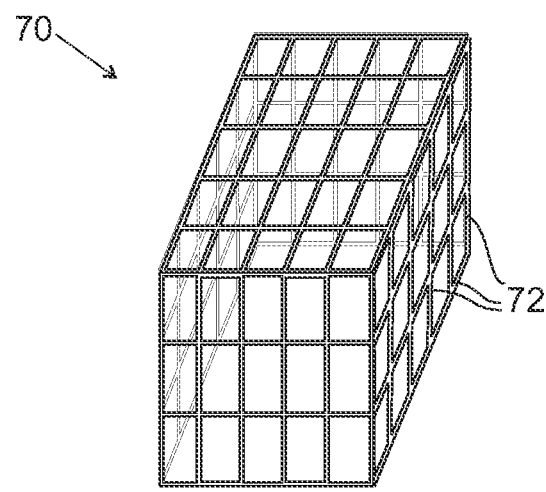
FIG. 4 illustrates a perspective view of an exemplary hollow structure created through use of a 3D printing device, according to an aspect of the present application. The depicted hollow structure includes a rectangular cross section.

Printing surface 12 is rotatable about an axis of rotation, as shown in FIGS. 2 and 3. In some embodiments, rotating printing surface 12 includes a cylindrical shape extending along a longitudinal axis, as shown in FIG. 2. This allows printing of a round or circular implant with a hollow region as the implant takes on the shape of the print surface. In some embodiments, the printing surface includes other cross-sectional shapes, such as, for example, rectangular, oval, polygonal, irregular, undulating, or lobed. For example, as shown in FIG. 3, printing surface 12 may have a rectangular cross-section extending along a longitudinal axis. This allows printing of a square or rectangular implant, as the print surface rotates, the implant will take the shape of the print surface. In alternative embodiments, printing surface 12 includes a uniform diameter and/or cross-section along its entire length. In other embodiments, printing surface 12 includes a changing diameter or cross-section along its length. For example, in some embodiments the diameter may increase from one end of printing surface 12 to the other. In some embodiments, the cross section of printing surface 12 changes from one end to the other. For example, one end of printing surface 12 may have a circular cross-section while the opposite end may have a rectangular cross-section. The size and shape of printing surface 12 may be changed according to the specifications and needs of a particular medical procedure. In some embodiments, meshes are printed onto the printing surface into which another object, such as for example, bone material (e.g. surface demineralized bone chips and fully demineralized bone fibers), can be placed inside the hollow region. The shape of printing surface 12 defines the shape of the hollow structure created. As shown in FIG. 2, the shape of the mesh bag 70 created is cylindrical. As shown in FIG. 4, the shape of the mesh bag 70 created is that of a hollowed out rectangular prism.

Printing surface 12 is rotatable about a rotation of axis defined by extension shaft 20, as discussed herein. In various embodiments, printing surface 12 is rotatable in either clockwise or counterclockwise directions. In various embodiments, printing surface 12 is rotatable in both clockwise and counterclockwise directions, as shown by arrow B in FIGS. 2 and 3. Printing surface 12 is configured to change direction of rotation multiple times throughout the course of fabrication of a hollow structure, such as, for example, mesh bag 70, as discussed herein. For example, the printing surface can rotate along a rotational axis 360 degrees clockwise and/or counterclockwise to print the implant.

In some embodiments, printing surface 12 is movable between an expanded configuration and a collapsed configuration. In some embodiments, material 40 (which can be a biodegradable polymer) is deposited onto printing surface 12 while in the expanded configuration, and printing surface 12 is moved to the collapsed configuration to remove the printed hollow structure. The print head 30 can contact the print surface 12 or there can be a gap between the print surface and the print head so that the material can be printed on the print surface.

In some embodiments, printing surface 12 is fixedly disposed with table 14 via a mounting bracket 18. The mounting bracket 18 may include covering 15 for protection. In some embodiments, mounting bracket 18 includes a motor to provide a rotational force to move printing surface 12. In some embodiments, mounting bracket 18 is connected to extension shaft 20. Printing surface 12 is connected to extension shaft 20 at a first end of printing surface 12. Extension shaft 20 defines an axis of rotation for printing surface 12 and is connected to mounting bracket 18 via collet 22. In some embodiments, collet 22 is expandable to loosen the grip on extension shaft 20. This allows extension shaft 20 and printing surface 12 to be changed out for another printing surface 12 which may be sized and/or shaped differently to cater to the needs of a particular procedure.

In some embodiments, the 3D printing device further includes a print head 30, such as, for example, an applicator that is movable in a direction transverse to the plane of movement for the base. In some embodiments, print head 30 is movable in the z axis, as shown by arrow A in FIG. 1, to allow for different size fixtures, variable surface structures and to control the thickness of the extruded layer. Thus, print head 30 is movable to have an adjustable distance from printing surface 12. Additionally, print head 30 is movable to accommodate printing surfaces having various diameters or printing surfaces having gradient diameters. In some embodiments, print head 30 is also movable in the x and y planes parallel with the plane of movement for the base. Thus, in some embodiments, print head 30 is movable in an opposite direction from the movement of printing surface 12 to facilitate faster printing. In some embodiments, print head 30 is suspended from track 35. Track 35 provides a base of support for print head 30. In some embodiments, track 35 provides a predefined route of allowable movement for print head 30 in directions shown as C. In some embodiments, track 35 is hollow to allow flow of material 40 to be delivered to printing surface 12, as described herein.

In some embodiments, printing surface 12 is treated with an adhesive material. The adhesive material may be textured or coated onto printing surface 12. The adhesive may be heat sensitive or heat activated such that printing surface 12 becomes adhesive to material 40 when printing surface 12 is heated, as discussed herein. An adhesive coating aids in preventing printed material 40 from falling off printing surface 12 during rotation. In some embodiments, the adhesive is deactivated through cooling. In some embodiments, the adhesive may be removed by placing printing surface in a solvent to dissolve the adhesive material. Once the adhesive material is removed, a hollow structure printed to printing surface 12 may be removed.

Figure 6:
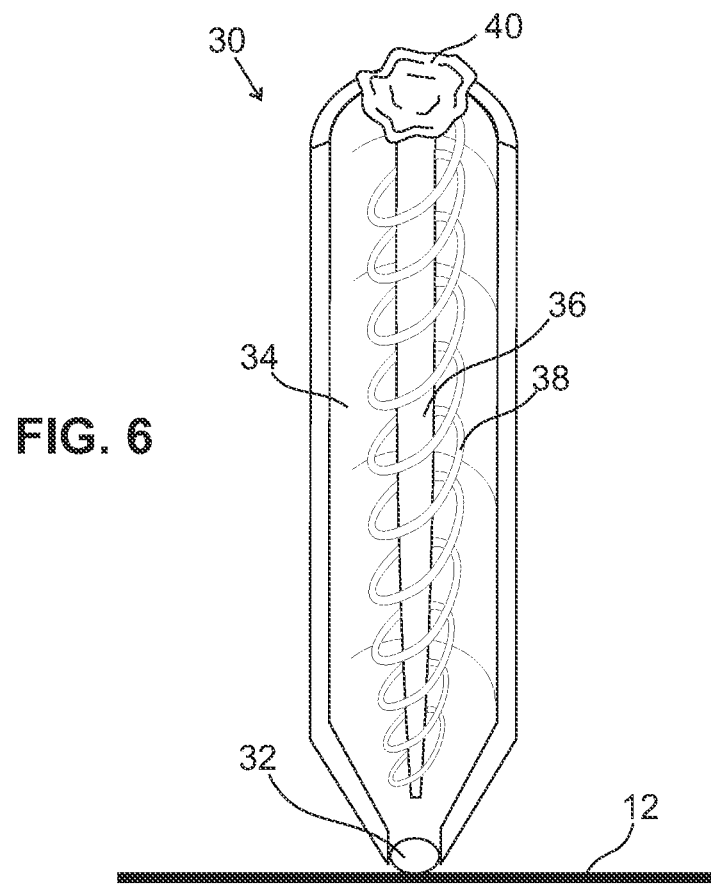
FIG. 6 illustrates a side view of components of an exemplary 3D printing device according to an aspect of the present application. Specifically, shown is a print head which processes material to be extruded to the printing surface.
Figure 7:
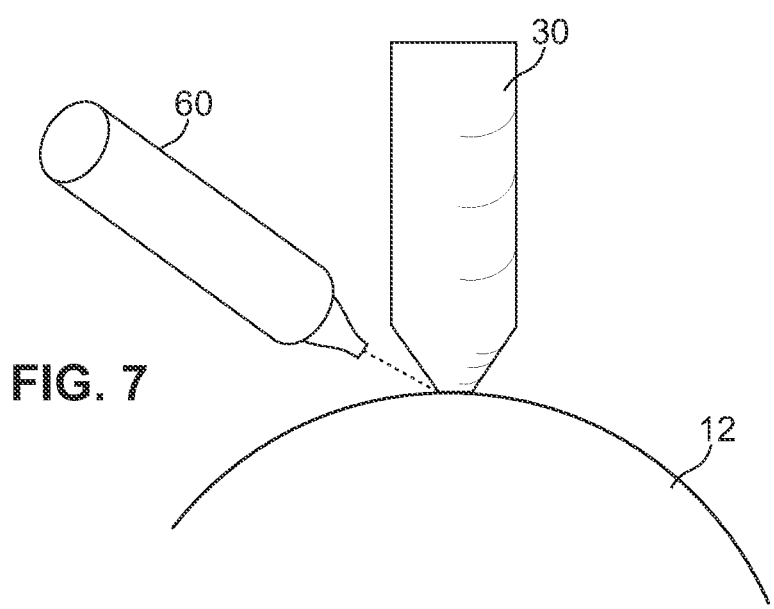
FIG. 7 illustrates a side view of components of an exemplary 3D printing device according to an aspect of the present application. Specifically, shown is a radiation source, such as, for example, a laser mounted adjacent the print head to apply an energy to sinter or melt the material discharged from the print head.

As shown in FIG. 6, print head 30 includes a distal opening 32 through which material 40 is deposited on printing surface 12. A tube portion 31 of print head 30 includes a first diameter and extends distally to a head portion 33 having a second diameter. In some embodiments, the second diameter is smaller than the first diameter. In various embodiments, material 40 includes a biodegradable polymer. In some embodiments, material 40 comprises a bioerodible, a bioabsorbable, and/or a biodegradable biopolymer. Examples of suitable sustained release biopolymers include but are not limited to poly (alpha-hydroxy acids), poly (lactide-co-glycolide) (PLGA), polylactide (PLA), polyglycolide (PG), polyethylene glycol (PEG) conjugates of poly (alpha-hydroxy acids), poly(orthoester)s (POE), polyaspirins, polyphosphagenes, collagen, starch, pre-gelatinized starch, hyaluronic acid, chitosans, gelatin, alginates, albumin, fibrin, vitamin E compounds, such as alpha tocopheryl acetate, d-alpha tocopheryl succinate, D,L-lactide, or L-lactide, caprolactone, dextrans, vinylpyrrolidone, polyvinyl alcohol (PVA), PVA-g-PLGA, PEGT-PBT copolymer (polyactive), PEO-PPO-PAA copolymers, PLGA-PEO-PLGA, PEG-PLG, PLA-PLGA, poloxamer 407, PEG-PLGA-PEG triblock copolymers, SAIB (sucrose acetate isobutyrate) or combinations thereof. In various embodiments, material 40 comprises poly(lactide-co-glycolide) (PLGA), polylactide (PLA), polyglycolide (PGA), D-lactide, D,L-lactide, L-lactide, D,L-lactide-co-ε-caprolactone, D,L-lactide-co-glycolide-co-ε-caprolactone, L-lactide-co-ε-caprolactone or a combination thereof.

Print head 30 includes an inner lumen 34 and a central feed shaft 36. Feed shaft is configured to turn feed threads 38 to feed material 40 from the proximal end of print head 30 through opening 32. Material 40 is maintained in an external reservoir (not shown) and fed into lumen 34. In some embodiments, material 40 is driven into lumen 34 by gravity. In some embodiments material 40 is drawn into lumen 34 by turning feed shaft 36 and feed threads 38. In some embodiments, 3D printing device includes multiple print heads 30, each configured to deposit material 40 onto printing surface 12.

In some embodiments, 3D printing device 10 further includes a temperature control unit 50 such as for example a heating or cooling unit connected to the printing surface. In some embodiments, temperature control unit 50 includes a heating unit. In other embodiments, temperature control unit 50 includes a cooling unit. In some embodiments, temperature control unit 50 is used to heat printing surface 12 through electric heating elements underneath the surface of printing surface 12. Sufficient energy may be supplied through such electric conduits to provide a temperature on the surface of printing surface 12 to melt and bond material 40 applied from print head 40. In such an embodiment, conduits 52 are electric heating conduits. In some embodiments, where material 40 comprises a highly viscous material, a heated printing surface 12 allows the material 40 to flow. In other embodiments, the material is heated or cooled in reservoir 37 to allow the desired flowability or viscosity of the material to make the implant.

In some embodiments, the temperature control unit comprises a cooling unit. The cooling unit is used to cool printing surface 12 through refrigerant supply and return lines underneath printing surface 12. In such an embodiment, the supply and return lines are conduits 52. The conduits 52 supply cooling fluid to printing surface 12 to cool and solidify hot material 40 extruded onto the surface.

In alternative embodiments, reservoir 37 can have the cooling and heating unit to allow cooling or heating of the material.

In some embodiments, 3D printing device 10 includes a radiation source configured to supply and transfer energy to at least a portion of the powder applied to the surface. In some embodiments, the radiation source is a laser positioned adjacent the print head. Laser 60 articulating such that the supplied beam can be focused on selected portions of printing surface 12. Laser 60 is configured to be used during or after print head 30 deposits material 40 onto printing surface 12. The beam of laser 60 is focused onto portions of material 40 on printing surface 12 to melt or sinter the material as desired. Once the printed hollow structure is complete, it may be removed from the residual powdered material 40 left on printing surface 12, or the residual powdered material 40 is brushed away. In some embodiments, the laser is focused at a point adjacent opening 32 to sinter material as it is deposited onto printing surface 12. Such embodiments may facilitate the elimination of waste since the majority of material 40 extruded onto printing surface 12 is sintered.

In some embodiments, laser 60 may include any wavelength of visible light or UV light. In some embodiments, laser 60 emits alternative forms of radiation, such as, for example, microwave, ultrasound or radio frequency radiation. In some embodiments, laser 60 is configured to be focused on a portion of printing surface 12 to sinter material 40 deposited thereon. Laser 60 may be emitted in a beam having a small diameter. For example, the diameter of the beam may be between about 0.01 mm and about 0.8 mm. In some embodiments, the diameter of the beam may be between about 0.1 mm and about 0.4 mm. In some embodiments, the diameter of the beam is adjustable to customize the intensity of the sintering. In some embodiments, the material is deposited on the print surface 12 and the print head removes by, for example, heating the material to remove unwanted material from the print surface to make the implant. The material remaining on the print surface after removal of the unwanted material will be the implant.

In some embodiments, 3D printing device 10 includes a controller or processor 102 to accept instructions and automatically manufacture a hollow structure, such as, for example, a mesh bag 70, based on the instructions. In some embodiments, processor 102 comprises memory 100 for temporary or permanent storage of instructions. Various instructions may be programmed and stored in the memory to make multiple designs of mesh bags. In some embodiments, 3D printing device 10 includes an input device 106, such as for example a keyboard to input commands and instructions. In some embodiments, processor 102 of 3D printing device 10 is configured to receive commands and instructions from an external computer. For example, various instructions may be stored and executed locally on an external computer to operate 3D printing device 10. In some embodiments, the computer, 3D printing device can be one single device with component parts.

In some embodiments, processor 102 comprises logic to execute one or more instructions to carry instructions of the computer system (e.g., transmit instructions to the 3D printer, etc.). The logic for executing instructions may be encoded in one or more tangible media for execution by the processor 102. For example, the processor 102 may execute codes stored in a computer-readable medium such as memory 100. The computer-readable medium may be stored in, for example, electronic (e.g., RAM (random access memory), ROM (read-only memory), EPROM (erasable programmable read-only memory)), magnetic, optical (e.g., CD (compact disc), DVD (digital video disc)), electromagnetic, semiconductor technology, or any other suitable medium.

In some embodiments, the instructions include dimensions of a mesh bag to be made. For example, the instructions may include programming as to the length and thickness of the mesh bag. Processor 102 carries out the instructions by causing movement of base 16 relative to the print head 30 while material 40 is applied to printing surface 12. Additionally, processor 102 may cause movement of print head 30 in a direction away from printing surface 12 to allow for a thicker layer of material 40, according to the predetermined specifications in the instructions. In some embodiments, processor 102 is configured to provide a single layer of material to make the mesh bag. The layer of material 40 deposited onto printing surface 12 may have uniform thicknesses or may include varied thicknesses, such as thickness gradients across the length of the mesh bag.

Once processor 102 receives the instructions, processor 102 directs the 3D printing device to make the mesh bag based on the received instructions. In some embodiments, processor 102 directs the lateral movement of base 16 and printing surface 12, and the movement of print head 30 transverse to base 16 and printing surface 12. In some embodiments, processor 102 also controls the direction of rotation, the degree of rotation and the speed of rotation of printing surface 12. In some embodiments, processor 102 moves, focuses and directs the radiation source 60 to emit radiation at a predetermined point on printing surface 12. In some embodiments, processor 102 directs the temperature control unit to heat or cool printing surface 12. Based on the instructions received, processor 102 coordinates simultaneous and/or ordered movement of base 16, printing surface 12, and print head 30 relative to one another. Processor 102 also controls the application of material 40 onto printing surface 12. For example, the processor 102 directs the pressure at which material 40 is released on to printing surface 12. Processor 102 also directs the patterns of application onto printing surface 12, including portions where material 40 is not applied to printing surface 12 to reduce waste. Processor 102 may also direct the radiation source 60 to emit radiation, such as for example, focused beams of light, in controlled pulses to sinter preselected portions of material 40 on printing surface 12.

In some embodiments, processor 102 directs motors which control the movement and rotation of at least base 16, printing surface 12, and print head 30 relative to one another. In some embodiments, processor 102 directs coarse and/or fine movement of components of 3D printing device 10.

Figure 8:
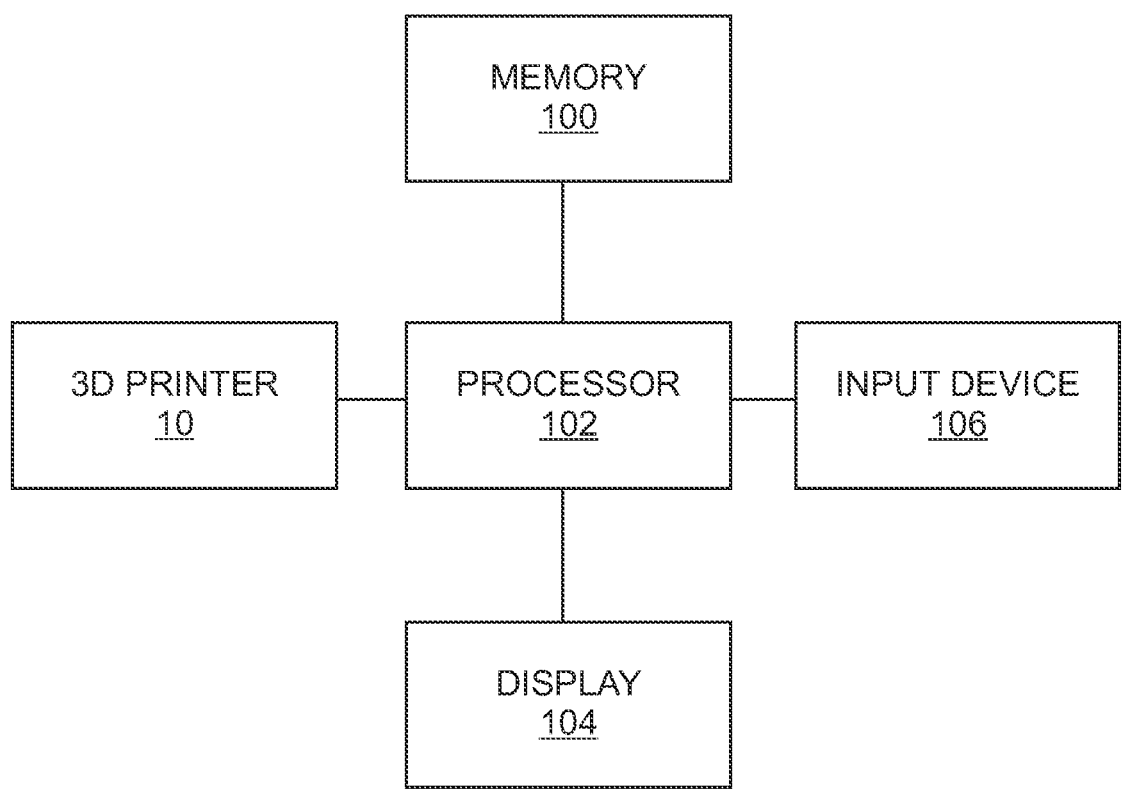
FIG. 8 illustrates an embodiment of a computer-implemented system for producing a hollow structure, such as a mesh bag.

Although the components of the system of FIG. 8 are shown as separate, they may combined in one or more computer systems. Indeed, they may be one or more hardware, software, or hybrid components residing in (or distributed among) one or more local or remote computer systems. It also should be readily apparent that the components of the system as described herein may be merely logical constructs or routines that are implemented as physical components combined or further separated into a variety of different components, sharing different resources (including processing units, memory, clock devices, software routines, logic commands, etc.) as required for the particular implementation of the embodiments disclosed. Indeed, even a single general purpose computer (or other processor-controlled device) executing a program stored on an article of manufacture (e.g., recording medium or other memory units) to produce the functionality referred to herein may be utilized to implement the illustrated embodiments. It also will be understood that the plurality of computers or servers can be used to allow the system to be a network based system having a plurality of computers linked to each other over the network or Internet or the plurality of computers can be connected to each other to transmit, edit, and receive data via cloud computers.

The computer (e.g., memory, processor, storage component, etc.) may be accessed by authorized users. Authorized users may include at least one engineer, technician, surgeon, physician, nurse, and/or health care provider, manufacturer, etc.).

The user can interface with the computer via a user interface that may include one or more display devices 104 (e.g., CRT, LCD, or other known displays) or other output devices (e.g., printer, etc.), and one or more input devices (e.g., keyboard, mouse, stylus, touch screen interface, or other known input mechanisms) for facilitating interaction of a user with the system via user interface. The user interface may be directly coupled to database or directly coupled to a network server system via the Internet or cloud computing. In accordance with one embodiment, one or more user interfaces are provided as part of (or in conjunction with) the illustrated systems to permit users to interact with the systems.

The user interface device may be implemented as a graphical user interface (GUI) containing a display 104 or the like, or may be a link to other user input/output devices known in the art. Individual ones of a plurality of devices (e.g., network/stand-alone computers, personal digital assistants (PDAs), WebTV (or other Internet-only) terminals, set-top boxes, cellular/phones, screenphones, pagers, blackberry, smart phones, iPhone, iPad, table, peer/non-peer technologies, kiosks, or other known (wired or wireless) communication devices, etc.) may similarly be used to execute one or more computer programs (e.g., universal Internet browser programs, dedicated interface programs, etc.) to allow users to interface with the systems in the manner described. Database hardware and software can be developed for access by users through personal computers, mainframes, and other processor-based devices. Users may access and data stored locally on hard drives, CD-ROMs, stored on network storage devices through a local area network, or stored on remote database systems through one or more disparate network paths (e.g., the Internet).

The database can be stored in storage devices or systems (e.g., Random Access Memory (RAM), Read Only Memory (ROM), hard disk drive (HDD), floppy drive, zip drive, compact disk-ROM, DVD, bubble memory, flash drive, redundant array of independent disks (RAID), network accessible storage (NAS) systems, storage area network (SAN) systems, etc.), CAS (content addressed storage) may also be one or more memory devices embedded within a CPU, or shared with one or more of the other components, and may be deployed locally or remotely relative to one or more components interacting with the memory or one or more modules. The database may include data storage device, a collection component for collecting information from users or other computers into centralized database, a tracking component for tracking information received and entered, a search component to search information in the database or other databases, a receiving component to receive a specific query from a user interface, and an accessing component to access centralized database. Receiving component is programmed for receiving a specific query from one of a plurality of users. The database may also include a processing component for searching and processing received queries against data storage device containing a variety of information collected by collection device.

The disclosed system may, in some embodiments, be a computer network based system. The computer network may take any wired/wireless form of known connective technology (e.g., corporate or individual LAN, enterprise WAN, intranet, Internet, Virtual Private Network (VPN), combinations of network systems, etc.) to allow a server to provide local/remote information and control data to/from other locations (e.g., other remote database servers, remote databases, network servers/user interfaces, etc.). In accordance with one embodiment, a network server may be serving one or more users over a collection of remote and disparate networks (e.g., Internet, intranet, VPN, cable, special high-speed ISDN lines, etc.). The network may comprise one or more interfaces (e.g., cards, adapters, ports) for receiving data, transmitting data to other network devices, and forwarding received data to internal components of the system (e.g., 3D printers, printer heads, etc.).

In accordance with one embodiment of the present application, the data may be downloaded in one or more textual/graphical formats (e.g., RTF, PDF, TIFF, JPEG, STL, XML, XDFL, TXT etc.), or set for alternative delivery to one or more specified locations (e.g., via e-mail, fax, regular mail, courier, etc.) in any desired format (e.g., print, storage on electronic media and/or computer readable storage media such as CD-ROM, etc.). The user may view viewing the search results and underlying documents at the user interface, which allows viewing of one or more documents on the same display 104.

Mesh Formulations

In some embodiments, mesh bags 70 are formed from material 40 extruded from print head 30. Mesh bags 70 comprise a system of threads 72 which are extruded directly onto printing surface 12. Threads 72 may be extruded in various patterns, and may be sized according to the requirements of a particular application. For example, threads 72 may be extruded from print head 30 in a weave pattern in which threads 72 are interwoven with one another such that each thread 72 alternatingly interlaces above and below adjacent threads 72. In other embodiments, threads 72 may be extruded in other ways. For example, horizontal rows of threads 72 may be extruded in a first step, and in a second step vertical rows of threads 72 may be extruded on top of the horizontal rows. A radiation source, such as laser 60 may be configured to sinter the extruded rows together to form a mesh bag 70.

Figure 5:
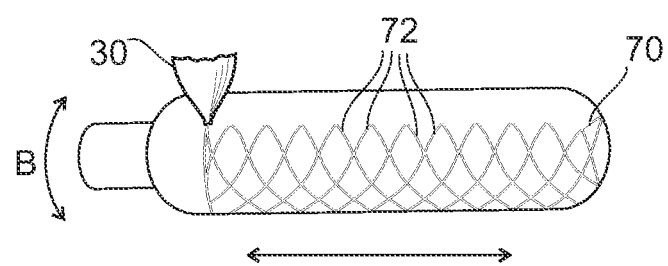
FIG. 5 illustrates a perspective view of components of an exemplary 3D printing device according to an aspect of the present application. Specifically, shown is the movement of a printing surface while a print head, such as, for example, an applicator continuously extrudes material to the surface to form a mesh pattern.
Figure 5A:
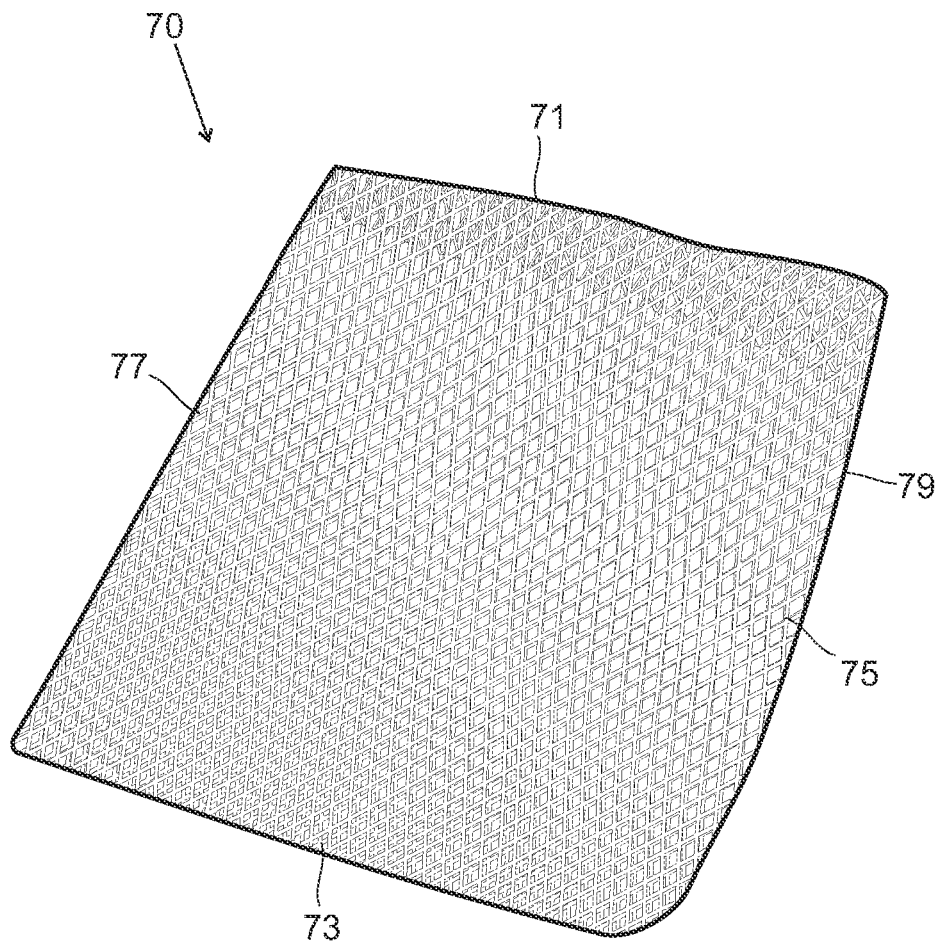
FIG. 5A illustrates a perspective view of a mesh bag having a hollow interior region formed from a 3D printing device according to an aspect of the present application.

In some embodiments as shown in FIG. 5A, a completely printed mesh bag 70 is formed having a continuous surface 75 formed from threads 72. Mesh bag 70 includes oppositely positioned ends 77, 79. There is no seal at these ends as the bag was 3D printed allowing for continuous manufacture. Mesh bags that are not manufactured by 3D printing would have seals on three of the four corners of the bag. In the 3D printed mesh bag of the current application, the bottom end 73 of the mesh bag is the only one sealed so that contents do not fall out. In some embodiments, end 71 is open to allow placement of bone material in the hollow region 81 of the mesh bag. Opening 71 allows entrance into the hollow region 81 of the mesh bag, where bone material is placed inside of it, the implant is then placed at a bone defect and the mesh bag allows the osteoinductive factors to leave the mesh bag and allows influx of bone cells into the mesh bag. The mesh bag is porous so as to allow influx and efflux of material.

Figure 5B:
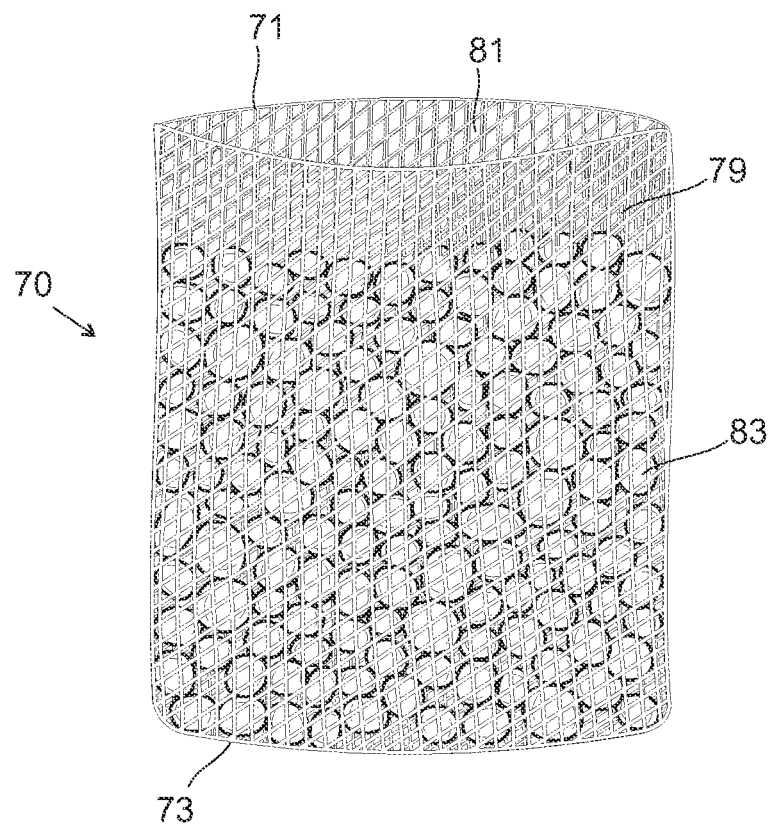
FIG. 5B illustrates a perspective view of a mesh bag as in FIG. 5A containing an osteogenic material in the hollow interior region.

In FIG. 5B, the hollow region 81 of the implant is shown below opening 71 of the mesh bag. The mesh bag is filled with bone particles 83 (e.g., surface demineralized chips and fully demineralized fibers) to enhance bone growth.

In some embodiments, the dimensions of the print surface 12 allows for printing a mesh bag 70 of different dimensions and shapes that correspond to the print surface 12 (e.g., circular, rectangular, square, etc.) The rotation of the print surface shown as B allows the implant (e.g., mesh bag 70) to be printed continuously so that there is a reduced need for sealing the hollow region of the implant.

In some embodiments, mesh bag 70 includes a flexibility as to be flat packable and extends between oppositely positioned ends 77 and 79. In some embodiments, mesh bag 70 forms a cylindrical shape between oppositely positioned ends 77 and 79.

The threads 72 may be configured to allow ingrowth of cells while also retaining the osteogenic material within the compartment of mesh bag 70. In some embodiments, print head 30 is configured to extrude threads 72 having a predetermined thickness. In some embodiments, strands 72 have a thickness of about 0.01 mm to about 2.0 mm. In some embodiments, strands 72 have a thickness of about 0.05 mm to about 1.0 mm, or about 0.1 to about 0.5 mm. The thickness of strands 72 may be uniform along the length of each strand, or varied across the length of each strand. In some embodiments, some strands 72 have a greater thickness than other strands 72 in a mesh bag 70. Strands 72 may be sized to allow for customizable pore sizes between strands 72. In some embodiments, the porous mesh bag 70 is configured to facilitate transfer of substances and/or materials surrounding the surgical site. Upon implantation to a surgical site, mesh bag 70 may participate in, control, or otherwise adjust, or penetration of the mesh bag by surrounding materials, such as cells or tissue.

In various embodiments, mesh bag 70 may be sized according to the needs of a particular application. For example, mesh bag 70 may include dimensions between about 1 mm to about 100 mm in diameter. In some embodiments, mesh bag 70 includes a diameter of about 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, or 100 mm. In some embodiments, mesh bag 70 includes a length between about 0.1 cm to about 10 cm. In some embodiments, mesh bag 70 includes a length of about 1 cm, 2 cm, 3 cm, 4 cm, 5 cm, 6 cm, 7 cm, 8 cm, 9 cm, or 10 cm.

In some embodiments, strands 72 are extruded onto printing surface 12 in a wave-like configuration having alternating peaks and crests. In some embodiments, printing surface 12 is rotated in alternating clockwise and counter-clockwise directions while material 40 is extruded onto the surface to create sinusoidal shaped waves having evenly shaped curves on the peaks and crests. In some embodiments, the peaks and crests of the waves are pointed to impart variable characteristics to mesh bag 70. In some embodiments, strands 72 are extruded adjacent to one another such that the peaks of a first strand 72 is extruded to contact the crest of an adjacent second strand 72. In some embodiments, the mesh bag may be created entirely from strands 72 having this configuration. Wave-shaped strands 72 impart flexibility and stretchable characteristics onto the manufactured mesh bag 70. The wavelength of the wave-shaped strands 72 may be altered to customize stretchability of mesh bag 70. For example, strands 72 having shorter wavelengths will be able to be stretched more than strands 72 having longer wavelengths. In some embodiments, the stretchability of mesh bag 70 is uniform across its length. In some embodiments, mesh bag 70 includes regions of increased stretchability according to the needs of a surgical application.

The shape, mesh size, thickness, and other structural characteristics, of the mesh bags e.g., architecture, may be customized for the desired application. For example, to optimize cell or fluid migration through the mesh, the pore size may be optimized for the viscosity and surface tension of the fluid or the size of the cells. For example, pore sizes between strands 72 on the order of approximately 100-200 µm may be used if cells are to migrate through the mesh. In other embodiments, the wave-shaped strands 72 may be extruded to have larger peaks and crests and the size of the pores may be larger. For example, in some embodiments, the pore size between strands 72 may be about 0.1 mm to about 5 mm, about 0.5 mm to about 3 mm, or about 1 mm to about 2 mm. Mesh size may be controlled by physically weaving strands and by controlling the thickness of strands 72 extruded and sintered on printing surface 12.

In various embodiments, the mesh bag made by 3D printing device 10 may have varying degrees of permeability across its surface. It may be permeable, semi-permeable, or non-permeable. Permeability may be with respect to cells, to liquids, to proteins, to growth factors, to bone morphogenetic proteins, or other. In further embodiments, the material may be braided.

The mesh bag may have any suitable configuration. For example, the mesh bag may be printed onto a printing surface 12 having a variety of shapes, such as, for example, a ring, a cylinder, a cage, a rectangular shape, a suture-like wrap, a continuous tube, or other configurations. Printing surface 12 provides a scaffold onto which mesh bag 70 is printed and from which mesh bag 70 derives its shape. In specific embodiments, the mesh bag may be formed as a thin tube designed to be inserted through catheters or an introducer tube, a rectangular shape designed to fit adjacent to spinal processes for posterolateral spine fusion, a cube like structure, as shown in FIG. 4, designed to fit between vertebral bodies or within cages for interbody spinal fusion, a tube-like shape, relatively flat shapes, rectangular shapes, structures preshaped to fit around various implants (e.g. dental, doughnut with hole for dental implants), or relatively elastic ring-like structures that will stretch and then conform to shapes (e.g. rubber band fitted around processes). In an embodiment wherein the mesh bag is formed as a cage, the cage may comprise a plurality of crossed fibers 72, which define between them a series of openings for tissue ingrowth. Any of these shapes may be used to contain osteogenic material such as bone material, as discussed herein. Mesh bags 70 may be printed and sintered onto printing surface 12 in such a way as to have one open end, as shown in FIG. 5. In other embodiments, mesh bag 70 may be printed and sintered onto printing surface 12 to have two open ends. At least one end is left open to allow mesh bag 70 to be loaded with an osteogenic material, such as bone material, as discussed herein. In various embodiments, mesh bag 70 is sealed at one or both ends prior to implantation at a surgical site. In various embodiments, the mesh sealed bag is sealed via heat sealing, stitching, adhesion, tying, fold lock and cinching.

In various embodiments, the manufactured mesh bags 70 may be formed having one or more opened ends to facilitate infusion with bone material. Additionally, the flexible character of the mesh material allows for the mesh bag 70 to be manipulated into a plurality of compartments. For example, in a tubular embodiment, the tube may be formed into a plurality of compartments by tying a cord around the tube at one or more points, or by other suitable mechanism such as crimping, twisting, knotting, stapling, or sewing.

A suitable mesh bag that can be made by the 3D printing device of the current application is MAGNIFUSE® Bone Graft, available from Medtronic, which comprises surface demineralized bone chips mixed with non-demineralized cortical bone fibers or fully demineralized bone fibers sealed in an absorbable PGA mesh bag or pouch.

In certain embodiments, a bone void can be filled by mesh bag 70 containing bone material. A compartment within mesh bag 70 can be at least partially filled with a bone repair substance. In various embodiments, at least partially filled as used herein, can mean that a percentage of the volume of a compartment or hollow region is at least 70% occupied, at least 75% occupied, at least 80% occupied, at least 85% occupied, at least 90% occupied, at least 95% occupied, or 100% occupied. Mesh bag 70 can be inserted into an opening in the defect until the defect is substantially filled. In various embodiments, a substantially filled as used herein can mean that a percentage of the volume of a defect is at least 70% occupied, at least 75% occupied, at least 80% occupied, at least 85% occupied, at least 90% occupied, at least 95% occupied, or 100% occupied. The excess material extending beyond the surface of the bone if the bone were without the defect can then be removed, or at least partially removed such that the opening of the defect is flush with the uninjured bone surface.

In some embodiments, mesh bag 70 may be labeled. Such labeling may be done in any suitable manner and at any suitable location on mesh bag 70. In some embodiments, labeling may be done by using a silk screen printing, using an altered weaving or knotting pattern, by using different colored threads 72, or other. The labeling may indicate information regarding mesh bag 70. Such information might include part number, donor id number, number, lettering or wording indicating order of use in the procedure or implant size, etc.

In one embodiment, mesh bag 70 may comprise a penetrable material at a first compartment configured for placement adjacent bone and a substantially impenetrable material at a second compartment configured for placement adjacent soft tissue. For example, the pore size between strands 72 at a first region of mesh bag 70 may be sized large enough to allow cell migration through mesh bag 70, but the pore size between strands 72 at a second region of mesh bag 70 may be sized small enough (or may include a lack of pores altogether) to prevent cell migration. Alternatively, the material of the mesh bag 70 may have a uniform configuration such that adjacent compartments may have substantially identical characteristics. By way of example only, mesh bag 70 may have a porous surface that is positioned adjacent bone, and a separate or opposite surface that has a generally impenetrable surface that is positioned adjacent soft tissue. Alternatively, mesh bag 70 may have one compartment that comprises a porous material, and a second compartment that comprises a substantially impenetrable material.

For both single and multi-compartment mesh bags 70, the mesh bag 70 may be closed after filling substances. Accordingly, mesh bag 70 may be provided in an unfilled, unsealed state immediately following fabrication with 3D printing device 10. After a substance for delivery is placed in mesh bag 70, mesh bag 70 may be permanently or temporarily closed. Permanent closure may be, for example, by heat sealing, stitching, adhesion, or other methods. Temporary closure may be by tying, fold lock, cinching, or other means. A temporarily closed mesh bag 70 can be opened without damaging the mesh bag during surgical implantation to add or remove substances in the mesh bag.

Suitable adhesives for use may include, for example, cyanoacrylates (such as histoacryl, B Braun, which is n-Butyl-2 Cyanoacrylate; or Dermabond, which is 2-octylcyanoacrylate); epoxy-based compounds, dental resin sealants, dental resin cements, glass ionomer cements, polymethyl methacrylate, gelatin-resorcinol-formaldehyde glues, collagen-based glues, inorganic bonding agents such as zinc phosphate, magnesium phosphate or other phosphate-based cements, zinc carboxylate, L-DOPA (3,4-dihydroxy-L-phenylalanine), proteins, carbohydrates, glycoproteins, mucopolysaccharides, other polysaccharides, hydrogels, protein-based binders such as fibrin glues and mussel-derived adhesive proteins, and any other suitable substance. Adhesives may be selected for use based on their bonding time; e.g., in some circumstances, a temporary adhesive may be desirable, e.g., for fixation during the surgical procedure and for a limited time thereafter, while in other circumstances a permanent adhesive may be desired. Where the compartment is made of a material that is resorbable, the adhesive can be selected that would adhere for about as long as the material is present in the body.

In some embodiments, biological attachment may be via mechanisms that promote tissue ingrowth such as by a porous coating or a hydroxyapatite-tricalcium phosphate (HA/TCP) coating. Generally, hydroxyapatite bonds by biological effects of new tissue formation. Porous ingrowth surfaces, such as titanium alloy materials in a beaded coating or tantalum porous metal or trabecular metal may be used and facilitate attachment at least by encouraging bone to grow through the porous implant surface. These mechanisms may be referred to as biological attachment mechanisms.

In some embodiments, mesh bag 70 comprises an extruded material 40 arranged in a mesh configuration. In some embodiments, material 40 of mesh bag 70 is biodegradable. In some embodiments, mesh bag 70 includes only one material which is uniformly extruded to form the entirety of mesh bag 70. In some embodiments, mesh bag 70 comprises a blend of suitable materials 40. In some embodiments, a first group of strands 72 may comprise a first material 40 and a second group of strands 72 comprises a second material 40. In some embodiments, print head 30 is configured to extrude more than one type of material 40. In some embodiments, a first print head 30 is configured to extrude a first material 40 to form threads 72 and a second print head 30 is configured to extrude a second material 40 to form threads 72.

In some embodiments, suitable materials include natural materials, synthetic polymeric resorbable materials, synthetic polymeric non-resorbable materials, and other materials. Natural mesh materials include silk, extracellular matrix (such as DBM, collagen, ligament, tendon tissue, or other), silk-elastin, elastin, collagen, and cellulose. Synthetic polymeric resorbable materials include poly(lactic acid) (PLA), poly(glycolic acid) (PGA), poly(lactic acid-glycolic acid) (PLGA), polydioxanone, PVA, polyurethanes, polycarbonates, and others.

In some embodiments, the material of mesh bag 70 comprises a polymer matrix. In some embodiments, DBM fibers and/or DBM powder are suspended in the polymer matrix to facilitate transfer of cells into and out of the mesh bag to induce bone growth at the surgical site. In various embodiments, mesh bag 70 further comprises mineralized bone fibers suspended in the polymer matrix. In some embodiments, the DBM powder is suspended in the polymer matrix between the DBM fibers and the mineralized bone fibers. In some embodiments, the DBM powder is suspended between the DBM fibers in the polymer matrix so as to reduce and/or eliminate gaps that exist between the fibers. In some embodiments, the DBM powder is suspended between the DBM fibers in the polymer matrix to improve osteoinductivity for facilitating bone fusion, for example, interspinous process fusion.

In some embodiments, the polymer matrix comprises a bioerodible, a bioabsorbable, and/or a biodegradable biopolymer that may provide immediate release, or sustained release. Examples of suitable sustained release biopolymers include but are not limited to poly (alpha-hydroxy acids), poly (lactide-co-glycolide) (PLGA), polylactide (PLA), polyglycolide (PG), polyethylene glycol (PEG) conjugates of poly (alpha-hydroxy acids), poly(orthoester)s (POE), polyaspirins, polyphosphagenes, collagen, starch, pre-gelatinized starch, hyaluronic acid, chitosans, gelatin, alginates, albumin, fibrin, vitamin E compounds, such as alpha tocopheryl acetate, d-alpha tocopheryl succinate. D,L-lactide, or L-lactide, caprolactone, dextrans, vinylpyrrolidone, polyvinyl alcohol (PVA), PVA-g-PLGA, PEGT-PBT copolymer (polyactive), PEO-PPO-PAA copolymers, PLGA-PEO-PLGA, PEG-PLG, PLA-PLGA, poloxamer 407, PEG-PLGA-PEG triblock copolymers, SAIB (sucrose acetate isobutyrate) or combinations thereof. As persons of ordinary skill are aware, mPEG and/or PEG may be used as a plasticizer for PLGA, but other polymers/excipients may be used to achieve the same effect. mPEG imparts malleability to the polymer. In some embodiments, these biopolymers may also be coated on mesh bag 70 to provide a desired release profile or ingrowth of tissue. In some embodiments, the coating thickness may be thin, for example, from about 5, 10, 15, 20, 25, 30, 35, 40, 45 or 50 microns to thicker coatings 60, 65, 70, 75, 80, 85, 90, 95, 100 microns to delay release of the substance from the medical device. In some embodiments, the range of the coating on the mesh bag ranges from about 5 microns to about 250 microns or 5 microns to about 200 microns.

In various embodiments, various components of mesh bag 70 comprises poly(lactide-co-glycolide) (PLGA), polylactide (PLA), polyglycolide (PGA), D-lactide, D,L-lactide, L-lactide, D,L-lactide-co-ε-caprolactone. D,L-lactide-co-glycolide-co-ε-caprolactone, L-lactide-co-ε-caprolactone or a combination thereof.

In some embodiments, material 40 of mesh bag 70 further comprises bone morphogenic proteins (BMPs), growth factors, antibiotics, angiogenesis promoting materials, bioactive agents or other actively releasing materials.

The mesh bag 70 may be used to deliver a substance comprising any suitable biocompatible material. In specific embodiments, mesh bag 70 may be used to deliver surface demineralized bone chips, optionally of a predetermined particle size, demineralized bone fibers, optionally pressed, and/or allograft. For embodiments wherein the substance is biologic, the substance may be autogenic, allogenic, xenogenic, or transgenic. Other suitable materials that may be positioned in mesh bag 70 include, for example, protein, nucleic acid, carbohydrate, lipids, collagen, allograft bone, autograft bone, cartilage stimulating substances, allograft cartilage, TCP, hydroxyapatite, calcium sulfate, polymer, nanofibrous polymers, growth factors, carriers for growth factors, growth factor extracts of tissues, DBM, dentine, bone marrow aspirate, bone marrow aspirate combined with various osteoinductive or osteoconductive carriers, concentrates of lipid derived or marrow derived adult stem cells, umbilical cord derived stem cells, adult or embryonic stem cells combined with various osteoinductive or osteoconductive carriers, transfected cell lines, bone forming cells derived from periosteum, combinations of bone stimulating and cartilage stimulating materials, committed or partially committed cells from the osteogenic or chondrogenic lineage, or combinations of any of the above.

In accordance with some embodiments, the material may be supplemented, further treated, or chemically modified with one or more bioactive agents or bioactive compounds. Bioactive agent or bioactive compound, as used herein, refers to a compound or entity that alters, inhibits, activates, or otherwise affects biological or chemical events. For example, bioactive agents may include, but are not limited to, osteogenic or chondrogenic proteins or peptides; DBM powder, collagen, insoluble collagen derivatives, etc., and soluble solids and/or liquids dissolved therein; anti-AIDS substances; anti-cancer substances; antimicrobials and/or antibiotics such as erythromycin, bacitracin, neomycin, penicillin, polymycin B, tetracyclines, biomycin, chloromycetin, and streptomycins, cefazolin, ampicillin, azactam, tobramycin, clindamycin and gentamycin, etc.; immunosuppressants; anti-viral substances such as substances effective against hepatitis; enzyme inhibitors; hormones; neurotoxins; opioids; hypnotics; anti-histamines; lubricants; tranquilizers; anti-convulsants; muscle relaxants and anti-Parkinson substances; anti-spasmodics and muscle contractants including channel blockers; miotics and anti-cholinergics; anti-glaucoma compounds; anti-parasite and/or anti-protozoal compounds; modulators of cell-extracellular matrix interactions including cell growth inhibitors and antiadhesion molecules; vasodilating agents; inhibitors of DNA, RNA, or protein synthesis; anti-hypertensives; analgesics; anti-pyretics; steroidal and non-steroidal anti-inflammatory agents; anti-angiogenic factors; angiogenic factors and polymeric carriers containing such factors; anti-secretory factors; anti-coagulants and/or antithrombotic agents; local anesthetics; ophthalmics; prostaglandins; anti-depressants; anti-psychotic substances; anti-emetics; imaging agents; biocidal/biostatic sugars such as dextran, glucose, etc.; amino acids; peptides; vitamins; inorganic elements; co-factors for protein synthesis; endocrine tissue or tissue fragments; synthesizers; enzymes such as alkaline phosphatase, collagenase, peptidases, oxidases, etc.; polymer cell scaffolds with parenchymal cells; collagen lattices; antigenic agents; cytoskeletal agents; cartilage fragments; living cells such as chondrocytes, bone marrow cells, mesenchymal stem cells; natural extracts; genetically engineered living cells or otherwise modified living cells; expanded or cultured cells; DNA delivered by plasmid, viral vectors, or other member; tissue transplants; autogenous tissues such as blood, serum, soft tissue, bone marrow, etc.; bioadhesives; bone morphogenic proteins (BMPs); osteoinductive factor (IFO); fibronectin (FN); endothelial cell growth factor (ECGF); vascular endothelial growth factor (VEGF); cementum attachment extracts (CAE); ketanserin; human growth hormone (HGH); animal growth hormones; epidermal growth factor (EGF); interleukins, e.g., interleukin-1 (IL-1), interleukin-2 (IL-2); human alpha thrombin; transforming growth factor (TGF-beta); insulin-like growth factors (IGF-1, IGF-2); parathyroid hormone (PTH); platelet derived growth factors (PDGF); fibroblast growth factors (FGF, BFGF, etc.); periodontal ligament chemotactic factor (PDLGF); enamel matrix proteins; growth and differentiation factors (GDF); hedgehog family of proteins; protein receptor molecules; small peptides derived from growth factors above; bone promoters; cytokines; somatotropin; bone digesters; antitumor agents; cellular attractants and attachment agents; immuno-suppressants; permeation enhancers, e.g., fatty acid esters such as laureate, myristate and stearate monoesters of polyethylene glycol, enamine derivatives, alpha-keto aldehydes, etc.; and nucleic acids.

In certain embodiments, the bioactive agent may be a drug. In some embodiments, the bioactive agent may be a growth factor, cytokine, extracellular matrix molecule, or a fragment or derivative thereof, for example, a protein or peptide sequence such as RGD.

In some embodiments, the material may have a modulus of elasticity in the range of about $1 \times 10^2$ to about $6 \times 10^5$ dyn/cm$^2$, or $2 \times 10^4$ to about $5 \times 10^5$ dyn/cm$^2$, or $5 \times 10^4$ to about $5 \times 10^5$ dyn/cm$^2$. After the device is administered to the target site, the material may have a modulus of elasticity in the range of about $1 \times -10^2$ to about $6 \times 10^5$ dynes/cm$^2$, or $2 \times 10^4$ to about $5 \times 10^5$ dynes/cm$^2$, or $5 \times 10^4$ to about $5 \times 10^5$ dynes/cm$^2$.

The material may have functional characteristics. Alternatively, other materials having functional characteristics may be incorporated into the mesh bag 70. Functional characteristics may include radiopacity, bacteriocidity, source for released materials, tackiness, etc. Such characteristics may be imparted substantially throughout mesh bag 70 or at only certain positions or portions of mesh bag 70.

Suitable radiopaque materials include, for example, ceramics, mineralized bone, ceramics/calcium phosphates/calcium sulfates, metal particles, fibers, and iodinated polymer (see, for example, WO/2007/143698). Polymeric materials may be used to form mesh bag 70 and be made radiopaque by iodinating them, such as taught for example in U.S. Pat. No. 6,585,755, herein incorporated by reference in its entirety. Other techniques for incorporating a biocompatible metal or metal salt into a polymer to increase radiopacity of the polymer may also be used. Suitable bacteriocidal materials may include, for example, trace metallic elements. In some embodiments, trace metallic elements may also encourage bone growth.

In some embodiments, mesh bag 70 may comprise a material that becomes tacky upon wetting. Such material may be, for example, a protein or gelatin based material. Tissue adhesives, including mussel adhesive proteins and cryanocrylates, may be used to impart tackiness to mesh bag 70. In further examples, alginate or chitosan material may be used to impart tackiness to mesh bag 70. In further embodiments, an adhesive substance or material may be placed on a portion of mesh bag 70 or in a particular region of mesh bag 70 to anchor that portion or region of mesh bag 70 in place at an implant site.

Bone Material

In various embodiments, the mesh bags made by 3D printing device 10 include compartments to hold osteogenic material, such as bone material. In various embodiments, the bone material may be particulated such as, for example, in bone powder or fiber form. If the bone is demineralized, the bone may be made into a particulate before, during or after demineralization. In some embodiments, the bone may be monolithic and may not be a particulate.

The bone may be milled and ground or otherwise processed into particles of an appropriate size before or after demineralization. The particles may be particulate (e.g., powder) or fibrous. The terms milling or grinding are not intended to be limited to production of particles of a specific type and may refer to production of particulate or fibrous particles. In certain embodiments, the particle size may be greater than 25 microns, such as ranging from about 25 to about 2000 microns, or from about 25 to about 500 microns or from about 200 to about 1000 microns. In some embodiments, the size of the bone powder particles are less than 100 microns. In some embodiments, the size of the bone powder particles are less than 500 microns.

In some embodiments, the particle size of the particles may be 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, 1000, 1005, 1010, 1015, 1020, 1025, 1030, 1035, 1040, 1045, 1050, 1055, 1060, 1065, 1070, 1075, 1080, 1085, 1090, 1095, 1100, 1105, 1110, 1115, 1120, 1125, 1130, 1135, 1140, 1145.1150, 1155, 1160, 1165, 1170, 1175, 1180, 1185, 1190, 1195, 1200, 1205, 1210, 1215, 1220, 1225, 1230, 1235, 1240, 1245, 1250, 1255, 1260, 1265, 1270, 1275, 1280, 1285, 1290, 1295, 1300, 1305, 1310, 1315, 1320, 1325, 1330, 1335, 1340, 1345, 1350, 1355, 1360, 1365, 1370, 1375, 1380, 1385, 1390, 1395, 1400, 1405, 1410, 1415, 1420, 1425, 1430, 1435, 1440, 1445, 1450, 1455, 1460, 1465, 1470, 1475, 1480, 1485, 1490, 1495, 1500, 1505, 1510, 1515, 1520, 1525, 1530, 1535, 1540, 1545, 1550, 1555, 1560, 1565, 1570, 1575, 1580, 1585, 1590, 1595, 1600, 1605, 1610, 1615, 1620, 1625, 1630, 1635, 1640, 1645, 1650, 1655, 1660, 1665, 1670, 1675, 1680, 1685, 1690, 1695, 1700, 1705, 1710, 1715, 1720, 1725, 1730, 1735, 1740, 1745, 1750, 1755, 1760, 1765, 1770, 1775, 1780, 1785, 1790, 1795, 1800, 1805, 1810, 1815, 1820, 1825, 1830, 1835, 1840, 1845, 1850, 1855, 1860, 1865, 1870, 1875, 1880, 1885, 1890, 1895, 1900, 1905, 1910, 1915, 1920, 1925, 1930, 1935, 1940, 1945, 1950, 1955, 1960, 1965, 1970, 1975, 1980, 1985, 1990, 1995 and/or 2000 microns. After grinding, the bone particles may be sieved to select those particles of a desired size. In certain embodiments, the particles may be sieved though a 25 micron sieve, a 50 micron sieve, a 75 micron sieve, a 100 micron sieve, a 125 micron sieve, a 150 micron sieve, a 175 micron sieve and/or a 200 micron sieve.

In some embodiments, the bone powder comprises DBM and/or mineralized bone. In some embodiments, the size of the bone powder particles is less than 25 microns. In some embodiments, the bone powder particle size is about 1, 2, 3, 4, 5, 6, 7, 8, 9, 10, 11, 12, 13, 14, 15, 16, 17, 18, 19, 20, 21, 22, 23 and/or 24 microns.

In various embodiments, the bone powder particles and/or the DBM and/or mineralized bone fibers have a sticky outer surface such that the bone powder can adhere to DBM and/or mineralized bone fibers. In various embodiments, the bone particles are naturally sticky. In some embodiments, an adhesive agent is applied to the bone powder and/or the bone fibers comprising a bio-adhesive, glue, cement, cyanoacrylate, silicones, hot melt adhesives and/or cellulosic binders. In various embodiments, the adhesive may be applied to the surface of the bone powder particles by spraying or brushing. In some embodiments, a charge is applied to the fibers and an opposite charge is applied to the bone powder, (i.e., the technique of electrostatic precipitation). The bone powder will be attracted to, and tenaciously adhere to, the surface of the fiber. Any of these application techniques can be repeated one or more times to build up a relatively thick layer of adherent bone powder on the surface of the fibers.

The bone powder can be applied directly to the DBM fiber and/or fully mineralized fiber and the mixture can be disposed in mesh bag 70. In some embodiments, the bone material inserted into a mesh bag 70 contains pores having a pore size from about 0.5 to about 2,000 microns. In some embodiments, bone material inserted into a mesh bag 70 contains pores having a pore size of from about 0.5, 5, 50, 100, 150, 200, 250, 300, 350, 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,550, 1,600, 1,650, 1,700, 1,750, 1,800, 1,850, 1,900, 1,950 to about 2,000 microns. In some embodiments, the pore size of the bone material is uniform. In some embodiments, the pore size of bone material is non-uniform and includes various pore sizes in the range from 0.5 to about 2,000 microns. Alternatively, the DBM fiber, and DBM powder can be placed in a polymer (e.g., collagen) and inserted into a porous biodegradable graft body (e.g., a pouch, container, mesh bag, etc.).

Following shaving, milling or other technique whereby they are obtained, the bone material is subjected to demineralization in order to reduce its inorganic content to a very low level, in some embodiments, to not more than about 5% by weight of residual calcium and preferably to not more than about 1% by weight residual calcium. Demineralization of the bone material ordinarily results in its contraction to some extent.

Bone used in the methods described herein may be autograft, allograft, or xenograft. In various embodiments, the bone may be cortical bone, cancellous bone, or corticocancellous bone. While specific discussion is made herein to demineralized bone matrix, bone matrix treated in accordance with the teachings herein may be non-demineralized, demineralized, partially demineralized, or surface demineralized. This discussion applies to demineralized, partially demineralized, and surface demineralized bone matrix. In one embodiment, the demineralized bone is sourced from bovine or human bone. In another embodiment, demineralized bone is sourced from human bone. In one embodiment, the demineralized bone is sourced from the patient's own bone (autogenous bone). In another embodiment, the demineralized bone is sourced from a different animal (including a cadaver) of the same species (allograft bone).

Any suitable manner of demineralizing the bone may be used. Demineralization of the bone material can be conducted in accordance with known conventional procedures. For example, in a preferred demineralization procedure, the bone materials useful for the implantable composition of this application are subjected to an acid demineralization step that is followed by a defatting/disinfecting step. The bone material is immersed in acid over time to effect its demineralization. Acids which can be employed in this step include inorganic acids such as hydrochloric acid and organic acids such as peracetic acid, acetic acid, citric acid, or propionic acid. The depth of demineralization into the bone surface can be controlled by adjusting the treatment time, temperature of the demineralizing solution, concentration of the demineralizing solution, agitation intensity during treatment, and other applied forces such as vacuum, centrifuge, pressure, and other factors such as known to those skilled in the art. Thus, in various embodiments, the bone material may be fully demineralized, partially demineralized, or surface demineralized.

After acid treatment, the bone is rinsed with sterile water for injection, buffered with a buffering agent to a final predetermined pH and then finally rinsed with water for injection to remove residual amounts of acid and buffering agent or washed with water to remove residual acid and thereby raise the pH. Following demineralization, the bone material is immersed in solution to effect its defatting. A preferred defatting/disinfectant solution is an aqueous solution of ethanol, the ethanol being a good solvent for lipids and the water being a good hydrophilic carrier to enable the solution to penetrate more deeply into the bone. The aqueous ethanol solution also disinfects the bone by killing vegetative microorganisms and viruses. Ordinarily at least about 10 to 40 weight percent by weight of water (i.e., about 60 to 90 weight percent of defatting agent such as alcohol) should be present in the defatting/disinfecting solution to produce optimal lipid removal and disinfection within the shortest period of time. The preferred concentration range of the defatting solution is from about 60 to 85 weight percent alcohol and most preferably about 70 weight percent alcohol.

Further in accordance with this application, the DBM material can be used immediately for preparation of the implant composition or it can be stored under aseptic conditions, advantageously in a critical point dried state prior to such preparation. In a preferred embodiment, the bone material can retain some of its original mineral content such that the composition is rendered capable of being imaged utilizing radiographic techniques.

In various embodiments, this application also provides bone matrix compositions comprising critical point drying (CPD) fibers. DBM includes the collagen matrix of the bone together with acid insoluble proteins including bone morphogenic proteins (BMPs) and other growth factors. It can be formulated for use as granules, gels, sponge material or putty and can be freeze-dried for storage. Sterilization procedures used to protect from disease transmission may reduce the activity of beneficial growth factors in the DBM. DBM provides an initial osteoconductive matrix and exhibits a degree of osteoinductive potential, inducing the infiltration and differentiation of osteoprogenitor cells from the surrounding tissues.

DBM preparations have been used for many years in orthopedic medicine to promote the formation of bone. For example, DBM has found use in the repair of fractures, in the fusion of vertebrae, in joint replacement surgery, and in treating bone destruction due to underlying disease such as rheumatoid arthritis. DBM is thought to promote bone formation in vivo by osteoconductive and osteoinductive processes. The osteoinductive effect of implanted DBM compositions is thought to result from the presence of active growth factors present on the isolated collagen-based matrix. These factors include members of the TGF-β, IGF, and BMP protein families. Particular examples of osteoinductive factors include TGF-3, IGF-1, IGF-2, BMP-2, BMP-7, parathyroid hormone (PTH), and angiogenic factors. Other osteoinductive factors such as osteocalcin and osteopontin are also likely to be present in DBM preparations as well. There are also likely to be other unnamed or undiscovered osteoinductive factors present in DBM.

In various embodiments, the DBM provided in the methods described in this application is prepared from elongated bone fibers which have been subjected to critical point drying. The elongated CPI) bone fibers employed in this application are generally characterized as having relatively high average length to average width ratios, also known as the aspect ratio. In various embodiments, the aspect ratio of the elongated bone fibers is at least from about 50:1 to about at least about 1000:1. Such elongated bone fibers can be readily obtained by any one of several methods, for example, by milling or shaving the surface of an entire bone or relatively large section of bone.

In other embodiments, the length of the fibers can be at least about 3.5 cm and average width from about 20 mm to about 1 cm. In various embodiments, the average length of the elongated fibers can be from about 3.5 cm to about 6.0 cm and the average width from about 20 mm to about 1 cm. In other embodiments, the elongated fibers can have an average length be from about 4.0 cm to about 6.0 cm and an average width from about 20 mm to about 1 cm.

In yet other embodiments, the diameter or average width of the elongated fibers is, for example, not more than about 1.00 cm, not more than 0.5 cm or not more than about 0.01 cm. In still other embodiments, the diameter or average width of the fibers can be from about 0.01 cm to about 0.4 cm or from about 0.02 cm to about 0.3 cm.

In another embodiment, the aspect ratio of the fibers can be from about 50:1 to about 950:1, from about 50:1 to about 750:1, from about 50:1 to about 500:1, from about 50:1 to about 250:1; or from about 50:1 to about 100:1. Fibers according to this disclosure can advantageously have an aspect ratio from about 50:1 to about 1000:1, from about 50:1 to about 950:1, from about 50:1 to about 750:1, from about 50:1 to about 600:1, from about 50:1 to about 350:1, from about 50:1 to about 200:1, from about 50:1 to about 100:1, or from about 50:1 to about 75:1.

In some embodiments, the chips to fibers ratio is about 90:10, 80:20, 70:30, 60:40, 50:50, 40:60, 30:70, 20:80 and/or 10:90. In various embodiments, a surface demineralized chips to fibers ratio is about 90:10, 80:20, 70:30, 60:40, 50:50, 40:60, 30:70, 20:80 and/or 10:90. In some embodiments, a surface demineralized chips to fully demineralized fibers ratio is about 90:10, 80:20, 70:30, 60:40, 50:50, 40:60, 30:70, 20:80 and/or 10:90.

In some embodiments, the DBM fibers have a thickness of about 0.5-4 mm. In various embodiments, the DBM fibers have a thickness of about 0.5, 0.6, 0.7, 0.8, 0.9, 1, 1.5, 2, 2.5, 3, 3.5 and/or 4 mm. In various embodiments, the ratio of DBM fibers to DBM powder is about 40:60 to about 90:10 W/W, W/V or V/V. In some embodiments, the ratio of mineralized bone fibers to DBM powder is about 25:75 to about 75:25 W/W, W/V or V/V. In various embodiments, the device comprises DBM fibers and mineralized fibers in a ratio of 40:60 to about 90:10 W/W, W/V or V/V. In some embodiments, the DBM fibers to DBM powder ratio, mineralized bone fibers to DBM powder ratio and/or the DBM fibers and mineralized fibers ratio is from 5:95 to about 95:5 W/W, W/V or V/V. In some embodiments, the DBM fibers to DBM powder ratio, mineralized bone fibers to DBM powder ratio and/or the DBM fibers and mineralized fibers ratio is 5:95, 10:90, 15:85, 20:80, 25:75, 30:70, 35:65, 40:60, 45:55, 50:50, 55:45, 60:40, 65:35, 70:30, 75:25, 80:20, 85:15, 90:10 and/or 95:5 W/W, W/V or V/V.

In some embodiments, the bone material comprises demineralized bone material comprising demineralized bone, fibers, powder, chips, triangular prisms, spheres, cubes, cylinders, shards or other shapes having irregular or random geometries. These can include, for example, "substantially demineralized." "partially demineralized." or "fully demineralized" cortical and/or cancellous bone. These also include surface demineralization, where the surface of the bone construct is substantially demineralized, partially demineralized, or fully demineralized, yet the body of the bone construct is fully mineralized.

In various embodiments, the bone graft material comprises fully DBM fibers and surface demineralized bone chips. In some embodiments, the ratio of fully DBM fibers to surface demineralized bone chips is from 5:95 to about 95:5 fibers to chips. In some embodiments, the ratio of fully DBM fibers to surface demineralized bone chips is 5:95, 10:90, 15:85, 20:80, 25:75, 30:70, 35:65, 40:60, 45:55, 50:50, 55:45, 60:40, 65:35, 70:30, 75:25, 80:20, 85:15, 90:10 and/or 95:5 fibers to chips. In various embodiments, the fully DBM fibers have a thickness of about 0.5-4 mm. In various embodiments, the fully DBM fibers have a thickness of about 0.5, 0.6, 0.7, 0.8, 0.9, 1, 1.5, 2, 2.5, 3, 3.5 and/or 4 mm.

In various embodiments, the fibers and/or the powder is surface DBM. In some embodiments, the fibers and/or the powder is surface DBM cortical allograft. In various embodiments, surface demineralization involves surface demineralization to at least a certain depth. For example, the surface demineralization of the of the allograft can be from about 0.25 mm, 0.5 mm, 1 mm, 1.5 mm, 2.0 mm, 2.5 mm, 3.0 mm. 3.5 mm, 4 mm, 4.5 mm, to about 5 mm. The edges of the bone fibers and/or powder may further be machined into any shape or to include features such as grooves, protrusions, indentations, etc., to help improve fit and limit any movement or micromotion to help fusion and/or osteoinduction to occur.

To prepare the osteogenic DBM, a quantity of fibers is combined with a biocompatible carrier to provide a demineralized bone matrix.

DBM typically is dried, for example via lyophilization or solvent drying, to store and maintain the DBM in active condition for implantation. Moreover, each of these processes is thought to reduce the overall surface area structure of bone. As may be appreciated, the structural damage of the exterior surface reduces the overall surface area. Physical alterations to the surface and reduction in surface area can affect cell attachment, mobility, proliferation, and differentiation. The surface's affinity for growth factors and release kinetics of growth factors from the surface may also be altered.

Accordingly, in some embodiments, methods for drying bone to store and maintain the bone in active condition for implantation that maintains or increases the surface area of the bone are provided. In one embodiment, the bone matrix is treated using critical point drying (CPD) technique, thereby reducing destruction of the surface of the bone. While specific description is made to critical point drying, it is to be appreciated that, in alternative embodiments, super critical point treatment may be used. In various embodiments utilizing CPD, a percentage of collagen fibrils on the surface of the bone are non-denatured after drying to a residual moisture content of approximately 15% or less. In some embodiments, after drying, the bone matrix has a residual moisture content of approximately 8% or less. In some embodiments, after drying, the bone matrix has a residual moisture content of approximately 6% or less. In some embodiments, after drying, the bone matrix has a residual moisture content of approximately 6% or less. In some embodiments, after drying, the bone matrix has a residual moisture content of approximately 3% or less.

Evaporative drying and freeze drying of specimens can cause deformation and collapse of surface structures, leading to a decrease in surface area. Without wishing to be bound to a particularly theory, this deformation and structure is thought to be caused because, as a substance crosses the boundary from liquid to gas, the substance volatilizes such that the volume of the liquid decreases. As this happens, surface tension at the solid-liquid interface pulls against any structures to which the liquid is attached. Delicate surface structures tend to be broken apart by this surface tension. Such damage may be caused by the effects of surface tension on the liquid/gas interface. Critical point drying is a technique that avoids effects of surface tension on the liquid/gas interface by substantially preventing a liquid/gas interface from developing. Critical point or supercritical drying does not cross any phase boundary, instead passing through the supercritical region, where the distinction between gas and liquid ceases to apply. As a result, materials dehydrated using critical point drying are not exposed to damaging surface tension forces. When the critical point of the liquid is reached, it is possible to pass from liquid to gas without abrupt change in state. Critical point drying can be used with bone matrices to phase change from liquid to dry gas without the effects of surface tension. Accordingly, bone dehydrated using critical point drying can retain or increase at least some of the surface structure and therefore the surface area.

In some embodiments, critical point drying is carried out using carbon dioxide. However, other mediums such as Freon, including Freon 13 (chlorotrifluoromethane), may be used. Generally, fluids suitable for supercritical drying include carbon dioxide (critical point 304.25 K at 7.39 MPa or 31.1° C. at 1072 psi or 31.2° C. and 73.8 bar) and Freon (about 300 K at 3.5-4 MPa or 25 to 30° C. at 500-600 psi). Nitrous oxide has similar physical behavior to carbon dioxide, but is a powerful oxidizer in its supercritical state. Supercritical water is also a powerful oxidizer, partly because its critical point occurs at such a high temperature (374° C.) and pressure (3212 psi/647K and 22.064 MPa).

In some embodiments, the bone may be pretreated to remove water prior to critical point drying. Thus, in accordance with one embodiment, bone matrix is dried using carbon dioxide in (or above) its critical point status. After demineralization, bone matrix samples (in water) may be dehydrated to remove residual water content. Such dehydration may be, for example, through a series of graded ethanol solutions (for example, 20%, 50%, 70%, 80%, 90%, 95%, 100% ethanol in deionized water). In some embodiments, penetrating the tissue with a graded series of ethanol solutions or alcohols may be accomplished in an automated fashion. For example, pressure and vacuum could be used to accelerate penetration into the tissue.

In alternative embodiments, other means or procedures for removing water (drying or dehydrating) from the bone may be used. For example, the bone may be washed with other dehydrating liquids such as acetone to remove water, exploiting the complete miscibility of these two fluids. The acetone may then be washed away with high pressure liquid carbon dioxide.

In some embodiments, the dehydrated bone matrix is placed in a chamber within a critical point drying (CPD) apparatus and flushed with liquid $CO_2$ to remove ethanol (or other dehydrating liquid). Flushing with liquid $CO_2$ may be done one or more times. The temperature and/or pressure are then raised to the critical point (the critical point for ($CO_2$ is reached at 31.2° C. and 73.8 bar). To perform critical point drying, the temperature and pressure may continue to be raised, for example to 40° C. with corresponding pressure of 85 bar. Thus, in some embodiments, the liquid carbon dioxide is heated until its pressure is at or above the critical point, at which time the pressure can be gradually released, allowing the gas to escape and leaving a dried product.

In certain embodiments, bone fibers processed using CPD have a BET surface area from about 1 to about 5 $m^2/gm$, a value 3 or 4 times greater than lyophilized bone fibers. In other embodiments, DBM fibers processed using CPD have a BET area surface from about 40 to about 100 $m^2/gm$, a value 100 times greater than when DBM fibers are lyophilized.

In a further embodiment, the critical point dried samples may further be treated, or alternatively be treated, with supercritical carbon dioxide (carbon dioxide above the critical point). Supercritical $CO_2$ may also be useful in viral inactivation. In some embodiments, thus, the bone matrix is placed in a supercritical $CO_2$ chamber and liquid $CO_2$ is introduced, for example, by an air pump. The temperature is raised to 105° C. with corresponding pressure about 485 bar. In alternative embodiments, other temperatures and/or pressures above the critical point of $CO_2$ may be used. The samples are soaked in supercritical $CO_2$ for a certain time and $CO_2$ is released. The resulting bone samples retain surface morphologies, hence surface area, and osteoinductivity after such treatment.

In yet a further embodiment, monolithic bone is demineralized and particulated before drying. Accordingly, the bone may be demineralized in monolithic pieces. The demineralized monolithic pieces may then be milled in a wet condition and critical point dried, for example using carbon dioxide as a medium.

In yet a further embodiment, monolithic bone is demineralized and dried before particulating (if done). Accordingly, the bone may be demineralized in monolithic pieces. The DBM is pressed in a wet condition and then critical point dried, for example using carbon dioxide as a medium. In alternatives of this embodiment, the demineralized and dried monolithic bone is not particulated and is processed as a monolithic implant.

Methods of Making

Figure 10:
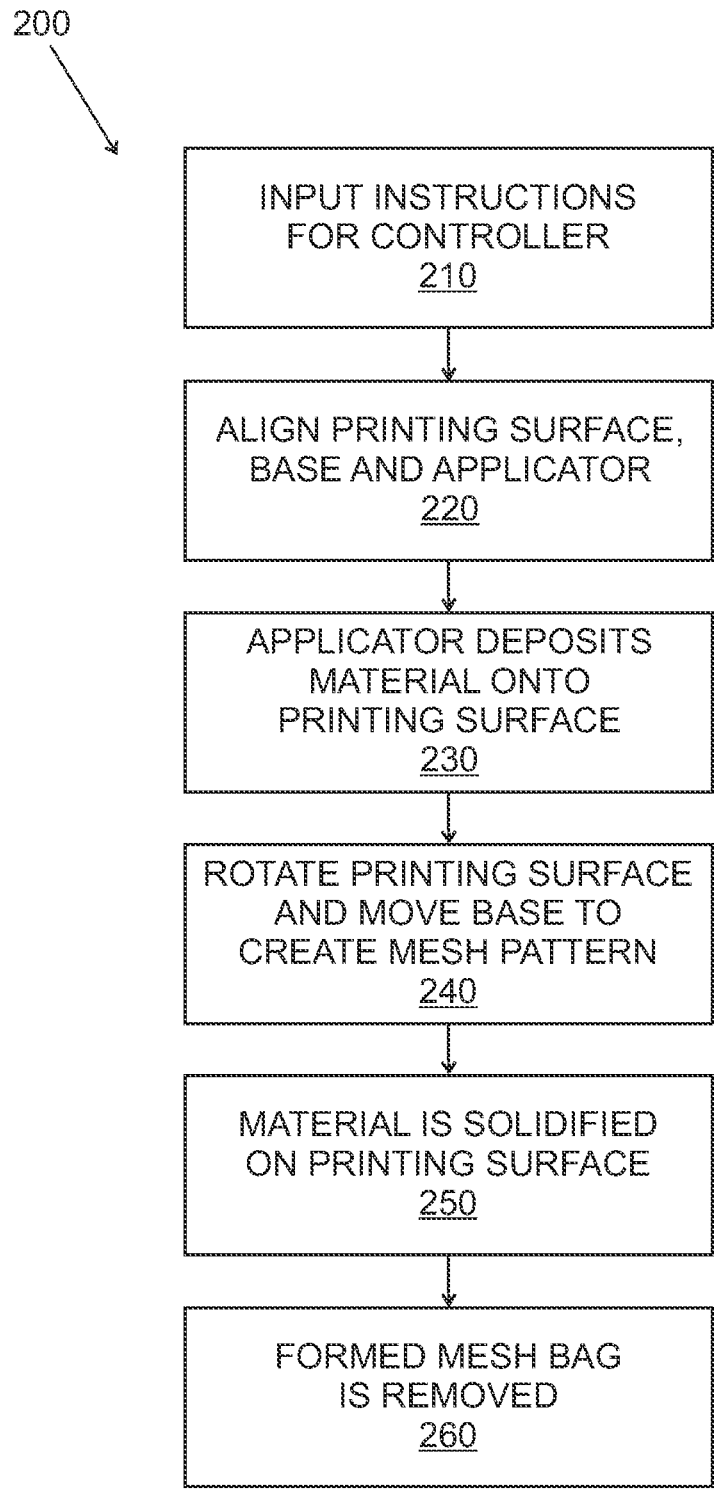
FIG. 10 is a flow diagram illustrating an embodiment of a system for producing a hollow structure, such as a mesh bag, through the use of a 3D printing machine having a rotating printing surface.

In various embodiments as shown in FIG. 10, a method 200 of fabricating a hollow structure, such as a mesh bag 70, through use of a 3D printing device 10 is provided. In some embodiments, the method includes step 210 for inputting instructions for a processor 102 to carry out the fabrication, step 220 for aligning the printing surface, base and print head relative to one another, step 230 for depositing material onto the printing surface, step 240 for rotating the printing surface and moving the base to create a mesh pattern, and step 250 for solidifying material on the printing surface, and step 260 for forming and removing the mesh bag. In some embodiments, the method comprises: rotating a print surface in alternating clockwise and counterclockwise directions, ejecting material from a print head to the print surface to make a strand having a wave-like pattern with alternating peaks and crests, and rotating the print head such an angular distance to create a plurality of interconnected strands on the print surface.

In some embodiments, a method for fabricating a hollow structure is provided which includes providing a 3D printing machine 10 having a table 14, a base 16 and a printing surface 12. In various embodiments, printing surface 12 is rotatable about an axis of rotation. Base 16 is configured for planar movement. Printing surface 12 is fixedly disposed with table 14 such that lateral movement of base 16 causes lateral movement of printing surface 12. In some embodiments, base 16 is movable in the x-y plane and is laterally movable in both the x axis and the y axis for precise positioning of printing surface 12. Movement of base 16 allows for positioning of printing surface 12 relative to extension shaft 20 to facilitate depositing materials onto printing surface 12, as discussed herein. 3D printing device 10 further includes a print head 30 to deposit material 40 onto printing surface 12.

In some embodiments, a processor 102 receives instructions for the fabrication of a mesh bag 70. A user may input instructions directly into 3D printing device 10 or may input instructions into an external computer in communication with processor 102. Processor 102 directs movement of base 16, printing surface 12 and print head 30 relative to one another. Processor 102 also directs application of material 40 from print head 30 onto printing surface 12.

In some embodiments, a user loads a material reservoir (not shown) in communication with print head 30 with a suitable material 40. The material may be in powder form, particulate form, gel form, or solid form. Processor 102 moves the printing surface 12 and one or more print heads 30 into place relative to one another. Once positioned, print head begins to deposit material 40 onto printing surface 12. In some embodiments, print head 30 continuously deposits material 40 as printing surface 12 is rotated and/or moved laterally along the x-y plane. In some embodiments, printing surface 12 is rotated in the clockwise and counterclockwise directions while base 16 moves laterally to form wave-shaped strands 72. The degree of rotation may be adjusted to impart flexible and stretchable qualities onto each of the formed strands 72. For example, strands 72 having shorter wavelengths will be able to be stretched more than strands 72 having longer wavelengths. In some embodiments, processor 102 directs rotation of printing surface 12 and lateral movement of base 16 to impart stretchability of mesh bag 70 that is uniform across its length. In some embodiments, processor 102 directs variable rotation of printing surface 12 and lateral movement of base 16 such that mesh bag 70 includes regions of increased stretchability according to the needs of a surgical application.

The movement of base 16, printing surface 12 and print head 30 relative to one another and the application of material 40 onto printing surface 12 is repeated a number of times such that strands 72 encompass the surface of printing surface 12. That is, each time a strand having a wave-like shape is applied to printing surface 12, a similar strand 72 is applied to printing surface 12 adjacent the first strand. In some embodiments, strands 72 are extruded adjacent to one another such that the peaks of a first strand 72 are extruded to contact the crest of an adjacent second strand 72. In some embodiments, the mesh bag may be created entirely from strands 72 having this configuration.

In some embodiments, print head 30 deposits material 40 in powdered form to printing surface 12. The material 40 must be sintered and/or melted to form strands 72. In some embodiments, a radiation source, such as laser 60 may be used in conjunction with print head 30. Processor 102 directs laser 60 to be focused at a point on which material 40 has been deposited adjacent print head 30. Processor 102 also provides power to laser 60 during desired intervals to prevent unwanted damage to mesh bag 70 and/or printing surface 12 according to the instructions. That is, laser 60 will emit a beam while sintering material 40 to create strands 72, but will not emit a beam when printing surface 12 is being repositioned relative to print head 30. Once all desired sintering has been completed, any excess material 40 may be brushed away from printing surface 12 to be discarded or recycled.

In some embodiments, material 40 may be sintered through use of a heating unit 50. Heating unit 50 provides energy to printing surface 12 such that powdered material 40 melts and molds together. An amount of heat may be provided such that the material 40 melts quickly upon contact with printing surface 12.

In some embodiments, printing surface 12 is heated or cooled using temperature control unit 50 to remove mesh bag 70. In some embodiments, printing surface 12 may be removed from 3D printing device 10 and submerged in a solvent to loosen and remove mesh bag 70.

Figure 9:
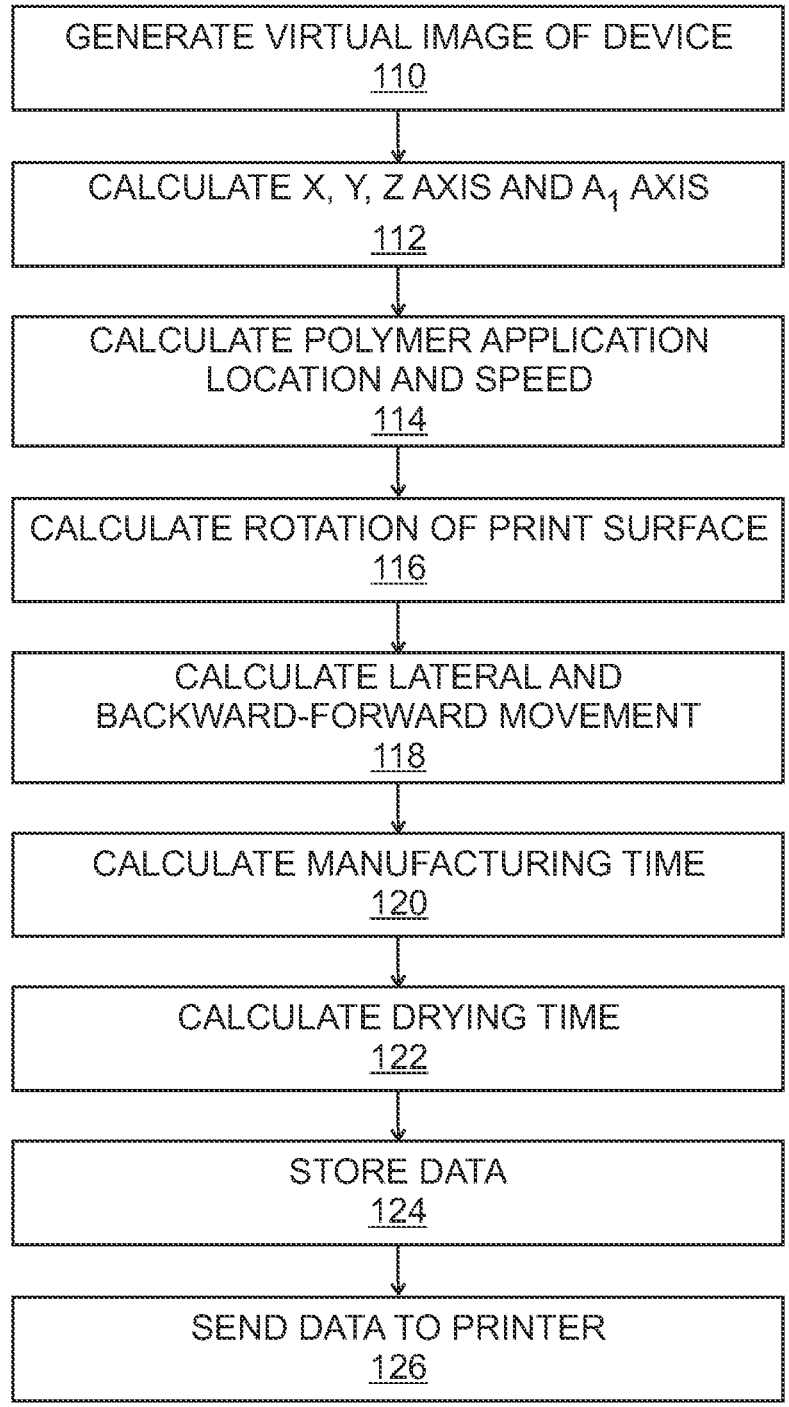
FIG. 9 is a flow diagram illustrating an embodiment of the computer-implemented system for producing a hollow structure, such as a mesh bag.

As shown in FIG. 9, a computer-implemented method for producing a hollow structure such as a mesh bag is illustrated. In a first step 110, a user or a designer generates an image of the object to be created with the 3D printing machine, such as, for example, mesh bag 70. Commercially available CAM software can make the CAD drawing/design of the medical implant into a computer code, (e.g., g-code). This code is sent to the device and the controller controls the device and the loading of the print head with the material, the heating and cooling temperature and time of the material, laser emit time, rotation, rotation speed of the print surface, print head, table, lateral movement of the print surface, print head, and table as well as other parameters. The controller device creates a medical implant from or in the material.

In a second step 112, processor 102 calculates the X, Y, Z and A axes. The device employs Cartesian coordinate system (X, Y, Z) for 3D motion control and employs a 4th axis (A) for the rotation of the print surface (e.g., 360 degrees) relative to the print head. The implant can be designed virtually in the computer with a CAD/CAM program, which is on a computer display. The user inputs specific parameters into the computer and then presses print on the display to start the 3D printing manufacturing. The computer logic causes the computer to execute loading of the print head with the material, application and thickness of the polymer from print head, the heating and cooling temperature and time of the device, laser emit time, rotation, rotation speed of the: print surface, print head, and/or print table, and/or lateral movement of the print surface, print head, and/or table as well as other parameters in accordance with the received instructions. The controller device causes the print head to be located at the appropriate X, Y, Z coordinates for 3D motion control and employs a 4th axis (A) for the rotation of the print surface (e.g., 360 degrees, 180 degrees, 120 degrees) relative to the print head to make a medical implant from or in the material. After the medical implant is produced on all or a portion of the print surface, it will have a hollow region which typically is greater than the diameter or thickness of the print surface and can be removed by a tool that engages the print surface. In some embodiments, the device can have a tool to seal, etch, shape, and/or dry the implant before, during or after it is removed from the print surface.

In a third step 114, processor 102 calculates the polymer application location and speed by planning coordination of the printing surface 12 and print head 30. Unlike typical 3D printing, in some embodiments, the current device does not manufacture the implant device by printing in successive layers the material to form the implant. In a fourth step 116 and a fifth step 118, processor 102 calculates the rotation of print surface 12 and the lateral and/or backward and forward movement of printing surface 12 and print head 30. In some embodiments, the print surface of the current application has the polymer continuously dispensed from the print head and onto the print surface as the print surface rotates in 360 degrees clockwise and/or counterclockwise relative to the print head and the print table, and/or print surface can, in some embodiments, move in a forward, lateral, and/or backward direction so that the strands to make the medical implant (e.g., mesh bag) are formed in accordance with the instructions received from the computer. In some embodiments, the print surface of the current application has a heat sensitive polymer disposed on it and then the print head receives instructions to heat the surface area to be removed (e.g., by laser, heating element, etc.). In this way, strands of the polymer are made by removing the heated portions of the polymer and what is left on the print surface are the strands for the implant. The print surface rotates in 360 degrees clockwise and/or counterclockwise relative to the print head and the print table, and/or print surface can, in some embodiments, move in a forward, lateral, and/or backward direction so that the strands to make the medical implant (e.g., mesh bag) are formed as the rest of the polymer is remove from the print surface in accordance with the instructions received from the computer.

In some embodiments, the print surface of the current application has the polymer in dry powder form continuously dispensed from the print head and onto the print surface as the print surface rotates in 360 degrees clockwise and/or counterclockwise relative to the print head and the print table, and/or print surface can, in some embodiments, move in a forward, lateral, and/or backward direction so that the strands to make the medical implant (e.g., mesh bag) are formed in accordance with the instructions received from the computer. After, the powder application, which can be from the print head from a reservoir therein, the print head (e.g., laser, heating element coupled thereto) can heat the powder polymer and form the strands for the medical implant.

Based on the above calculations, processor 102 calculates a projected amount of time it will take to manufacture the medical implant in step 120. In a subsequent step 122, processor 102 calculates the amount of time it will take for the printed medical device to dry. In some embodiments, the material applied to printing surface is temperature sensitive and dries and/or cures through heating or cooling. In some embodiments, processor 120 directs a temperature control unit to heat or cool printing surface 12. In some embodiments, processor 120 directs a laser to focus its beam on the material applied to printing surface 12 to sinter and cure the material.

In step 124, the data calculated by processor 102 is stored in memory 100 for subsequent implementation. In some embodiments, processor 102 processes and organizes the calculated data into memory 100. In some embodiments, processor 100 includes value-determining logic, development logic, security logic, and/or analytical logic. In some embodiments, processor 102 updates the memory 100 with any new calculation data received from the user. In some embodiments, there is a computer readable storage medium storing instructions that, when executed by a computer, cause the computer to display options for a user to enter, view, and edit some or all features for manufacturing the implant including the loading of the print head with the material, the heating and cooling temperature and time of the material, laser emit time, rotation angle, rotation speed of the print surface, print head, table, lateral movement of the print surface, print head, and table as well as other parameters. The controller device creates a medical implant from or in the material by instructions received from the computer. The device employs Cartesian coordinate system (X, Y, Z) for 3D motion control and employs a 4th axis (A) for the rotation of the print surface (e.g., 360 degrees) relative to the print head.

In a final step 126, the user inputs a command to send the stored data to the printer to create the medical device. The user inputs specific parameters into the computer and then presses print on the display to start the 3D printing manufacturing. The computer logic causes the computer to execute loading of the print head with the material, the heating and cooling temperature and time of the device, laser emit time, rotation, rotation speed of the: print surface, print head, and/or print table, and/or lateral movement of the print surface, print head, and/or table as well as other parameters. The controller device causes the print head to be located at the appropriate X, Y, Z coordinates for 3D motion control and employs a 4th axis (A) for the rotation of the print surface (e.g., 360 degrees, 180 degrees, 120 degrees) relative to the print head to make a medical implant from or in the material.

Any suitable method may be used for loading a bone material into the mesh bag in the operating room or at the surgical site. In some embodiments, the bone material may be spooned into the mesh bag, the substance may be placed in the mesh bag body using forceps, the substance may be loaded into the mesh bag using a syringe (with or without a needle), or the substance may be inserted into the mesh bag in any other suitable manner. Specific embodiments for loading at the surgical site include for vertebroplasty or for interbody space filler.

For placement, the substance or substances may be provided in the mesh bag and placed in vivo, for example at a bone defect. In one embodiment, the mesh bag is placed in vivo by placing the mesh bag in a catheter or tubular inserter and delivering the mesh bag with the catheter or tubular inserter. The mesh bag, with a substance provided therein, may be steerable such that it can be used with flexible introducer instruments for, for example, minimally invasive spinal procedures. For example, the osteoimplant may be introduced down a tubular retractor or scope, during XLIF, TLIF, or other procedures. In other embodiments, the mesh bag (with or without substance loaded) may be placed in a cage, for example for interbody fusion.

In some embodiments, the mesh bag may be prefilled with a substance for delivery and other compartments may be empty for filling by the surgeon.

The mesh bag may be used in any suitable application. In some embodiments, the mesh bag may be used in healing vertebral compression fractures, interbody fusion, minimally invasive procedures, posterolateral fusion, correction of adult or pediatric scoliosis, treating long bone defects, osteochondral defects, ridge augmentation (dental/craniomaxillofacial, e.g. edentulous patients), beneath trauma plates, tibial plateau defects, filling bone cysts, wound healing, around trauma, contouring (cosmetic/plastic/reconstructive surgery), and others. The mesh bag may be used in a minimally invasive procedure via placement through a small incision, via delivery through a tube, or other. The size and shape may be designed with restrictions on delivery conditions.

In some embodiments, the mesh bag is flexible enough so that it can be folded upon itself before it is implanted at, near or in the bone defect.

An exemplary application for using a mesh bag as disclosed is fusion of the spine. In clinical use, the mesh bag and delivered substance may be used to bridge the gap between the transverse processes of adjacent or sequential vertebral bodies. The mesh bag may be used to bridge two or more spinal motion segments. The mesh bag surrounds the substance to be implanted, and contains the substance to provide a focus for healing activity in the body.

Generally, the mesh bag may be applied to a pre-existing defect, to a created channel, or to a modified defect. Thus, for example, a channel may be formed in a bone, or a pre-existing defect may be cut to form a channel, for receipt of the device. The mesh bag may be configured to match the channel or defect. In some embodiments, the configuration of the mesh bag may be chosen to match the channel. In other embodiments, the channel may be created, or the defect expanded or altered, to reflect a configuration of the mesh bag. The mesh bag may be placed in the defect or channel and, optionally, coupled using attachment mechanisms.

Although the invention has been described with reference to preferred embodiments, persons skilled in the art will recognize that changes may be made in form and detail without departing from the spirit and scope of the invention.

What is claimed is:

1. A device for making an implant having a hollow region, the device comprising a print surface rotatable in a clockwise and counterclockwise direction about an axis of rotation; a print head disposed adjacent to and substantially transverse to the print surface, the print head configured to continuously apply a material used to make the implant on at least a portion of the print surface or heat the material disposed on at least a portion of the print surface used to make the implant; and a base disposed adjacent to the print head and contacting the print surface, the base configured to be movable in forward, backward and lateral directions relative to the print head to make the implant having the hollow region, wherein the print surface is disposed with the base via a mounting bracket, the mounting bracket comprising an extension shaft connected to the mounting bracket by a collet, the extension shaft defining the axis of rotation for the print surface, wherein the implant is configured to be removed from the print surface.

2. A device of claim 1, further comprising a processor configured to receive instructions for moving the base, print surface and print head to make the implant having the hollow region.

3. A device of claim 1, wherein (i) the print surface is centered about the axis of rotation; or (ii) the print head is immovable and positioned above the print surface.

4. A device of claim 1, wherein the material comprises (i) a biodegradable polymer configured to be printed into a mesh bag, the mesh bag having no seals in its upper and lower portion; or (ii) a biodegradable polymer being in powder form configured to be applied to the print surface and heated by the print head to make the implant.

5. A device of claim 1, wherein the biodegradable polymers comprise poly(lactic acid), poly(glycolic acid), poly(lactic acid-glycolic acid), polydioxanone, PVA, polyurethanes, polycarbonates, polyhydroxyalkanoates (polyhydroxybutyrates and polyhydroxyvalerates and copolymers), polysaccharides, polyhydroxyalkanoates polyglycolide-co-caprolactone, polyethylene oxide, polypropylene oxide, polyglycolide-co-trimethylene carbonate, poly(lactic-co-glycolic acid) or combinations thereof.

6. A device of claim 2, wherein (i) the processor is configured to rotate the print surface relative to the print head and eject the material from the print head or (ii) a laser is disposed on the print head to heat the material.

7. A device of claim 2, wherein the processor is configured to rotate the print surface up to 360 degrees relative to the print head and to melt or remove the material from the print surface.

8. A device of claim 1, wherein a table is configured to move in the backward and forward direction in a substantially straight line and the lateral direction in a substantially straight line.

9. A device of claim 1, further comprising a temperature control unit coupled to the print head and/or print surface configured to affect the temperature of the print head and/or print surface.

10. A device of claim 1, wherein the print surface is textured or coated with an adhesive material.

11. A device of claim 1, wherein the print surface is movable between an expanded configuration and a contracted configuration.

12. A device for making an implant having a hollow region, the device comprising a print surface rotatable in a clockwise and counterclockwise direction about an axis of rotation relative to a print head, and at least one of (i) the print surface configured to be movable in forward and backward directions relative to the print head or (ii) the print head configured to be movable in forward and backward directions relative to the print surface, the print head disposed adjacent to and substantially transverse to the print surface; and the print head configured to continuously apply a material used to make the implant on at least a portion of the print surface or heat the material disposed on at least a portion of the print surface used to make the implant having the hollow region, wherein the material is driven into a lumen of the print head by gravity, and the print surface is disposed with the base via a mounting bracket, the mounting bracket comprising an extension shaft connected to the mounting bracket by a collet, the extension shaft defining the axis of rotation for the print surface, wherein the implant is configured to be removed from the print surface following completion of printing such that the print surface and the implant are separated.

13. A device according to claim 12, further comprising a processor configured to receive instructions for moving the print surface and print head to make the implant having the hollow region.

14. A device according to claim 12, wherein (i) the print head also moves in a lateral direction side to side relative to the print surface or (ii) a laser is disposed on the print head to heat the material.

15. A device of claim 12, wherein the material comprises (i) a biodegradable polymer configured to be printed into a mesh bag, the mesh bag having no seals in its upper and lower portion; or (ii) a biodegradable polymer being in powder form configured to be applied to the print surface and heated by the print head to make the implant.

16. A device of claim 15, wherein the biodegradable polymers comprise poly(lactic acid), poly(glycolic acid), poly(lactic acid-glycolic acid), polydioxanone, PVA, polyurethanes, polycarbonates, polyhydroxyalkanoates (polyhydroxybutyrates and polyhydroxyvalerates and copolymers), polysaccharides, polyhydroxyalkanoates polyglycolide-co-caprolactone, polyethylene oxide, polypropylene oxide, polyglycolide-co-trimethylene carbonate, poly(lactic-co-glycolic acid) or combinations thereof.

17. A device of claim 12, wherein the processor is configured to rotate the print surface up to 360 degrees relative to the print head and to melt or remove the material from the print surface.

18. A device of claim 4, wherein the mesh bag comprises a system of threads such that horizontal rows of threads and vertical rows of threads are extruded directly onto the print surface.

19. A device of claim 12, wherein the print head is movable in a direction opposite from the direction of movement of the printing surface and the lumen of the print head includes a first diameter and extends distally to a head portion having a second diameter, the second diameter smaller than the first diameter.

* * * * *